US012738005B2

(12) United States Patent
Wang et al.

(10) Patent No.: US 12,738,005 B2
(45) Date of Patent: Sep. 15, 2026

(54) APPARATUS AND METHOD WITH HOMOGRAPHIC IMAGE PROCESSING

(71) Applicant: SAMSUNG ELECTRONICS CO., LTD., Suwon-si (KR)

(72) Inventors: Yasi Wang, Beijing (CN); Chao Zhang, Beijing (CN); Hong Liu, Beijing (CN); Jingu Heo, Suwon-si (KR); Dong Kyung Nam, Suwon-si (KR); Qiang Wang, Beijing (CN); Lu Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 18/591,593

(22) Filed: Feb. 29, 2024

(65) Prior Publication Data

US 2024/0303777 A1 Sep. 12, 2024

(30) Foreign Application Priority Data

Mar. 6, 2023 (CN) ........................ 202310213162.2
Jan. 11, 2024 (KR) ........................ 10-2024-0004782

(51) Int. Cl.
*G06T 5/50* (2006.01)
*G06T 7/10* (2017.01)
(Continued)

(52) U.S. Cl.
CPC .................. *G06T 5/50* (2013.01); *G06T 7/10* (2017.01); *G06V 10/24* (2022.01); *G06V 10/771* (2022.01);
(Continued)

(58) Field of Classification Search
CPC .... G06T 3/14; G06T 5/50; G06T 7/10; G06T 7/11; G06T 7/194; G06T 7/174;
(Continued)

(56) References Cited

U.S. PATENT DOCUMENTS 11,538,140 B2 12/2022 Zhou et al.
2018/0158199 A1* 6/2018 Wang ........................ G06T 3/18
(Continued)

FOREIGN PATENT DOCUMENTS

KR 10-2405428 B1 6/2022

OTHER PUBLICATIONS

Okorie et al. "Region-based image registration for remote sensing imagery", Dec. 2019, vol. 189, https://doi.org/10.1016/j.cviu.2019.102825. (Year: 2019).*

*Primary Examiner* — Kee M Tung
*Assistant Examiner* — Thang Gia Huynh
(74) *Attorney, Agent, or Firm* — NSIP Law

(57) ABSTRACT

An apparatus and method for processing an image are disclosed. The method includes: segmenting both a first image and a second image and generating segmentation mask pairs, each segmentation mask pair having a segmentation mask of the first image and a segmentation mask of the second image; generating local homography matrices of the first image with respect to the second image, based on the segmentation mask pairs, the first image, and the second image; and generating a synthetic image obtained by aligning the first image with the second image, wherein the aligning is performed based on the local homography matrices, the segmentation mask pairs, the first image, and the second image.

20 Claims, 17 Drawing Sheets

(51) Int. Cl.
*G06V 10/24* (2022.01)
*G06V 10/771* (2022.01)

(52) U.S. Cl.
CPC ............... *G06T 2207/20081* (2013.01); *G06T 2207/20221* (2013.01)

(58) Field of Classification Search
CPC ........... G06T 11/60; G06T 2207/20081; G06T 2207/20221; G06V 10/24; G06V 10/771
See application file for complete search history.

(56) References Cited

U.S. PATENT DOCUMENTS

2021/0390747 A1 12/2021 Feng et al.
2022/0156943 A1* 5/2022 Zhang .................. G06V 10/776
2022/0284609 A1* 9/2022 Shree ...................... G06T 7/543
2022/0301311 A1 9/2022 Abati et al.
2023/0169666 A1* 6/2023 Pati ...................... A61B 6/5241
382/132

* cited by examiner

APPARATUS AND METHOD WITH HOMOGRAPHIC IMAGE PROCESSING

CROSS-REFERENCE TO RELATED APPLICATIONS

This application claims the benefit under 35 USC § 119(a) of Chinese Patent Application No. 202310213162.2, filed on Mar. 6, 2023, in the China National Intellectual Property Administration, and Korean Patent Application No. 10-2024-0004782, filed on Jan. 11, 2024, in the Korean Intellectual Property Office, the entire disclosures of which are incorporated herein by reference for all purposes.

BACKGROUND

1. Field

The following description relates to an image processing field, and more particularly, to image processing technology based on unsupervised-depth multi-homography matrix estimation.

2. Description of Related Art

A homography matrix describes a correspondence relationship among a pair of images obtained by capturing the same plane from different positions of a camera (disregarding lens distortion). A homography matrix is a type of image alignment method that is widely used in various fields such as image stitching, camera calibration, simultaneous localization and mapping (SLAM), etc. For a single-matrix homographic matrix to solve a homographic relationship, the following constraints need to be satisfied:

(1) there is only rotational movement and no translational movement of a camera.

(2) objects are on the same plane.

(3) a capturing scene is sufficiently far from an observer/viewpoint.

A solution of an optimal homography matrix exists only when these three conditions are rigorously satisfied. When a scenario does not satisfy these three conditions, existing techniques generally and approximately estimate a global homography matrix. However, the global homography matrix is not sufficient to model a correspondence relationship between a pair of images and generally compromises in various planes or focuses on the main plane and does not consider or solve plane parallax problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An apparatus and method may be for processing an image based on multi-homography matrix estimation.

In one general aspect, a method of processing an image includes: segmenting both a first image and a second image and generating segmentation mask pairs, each segmentation mask pair having a segmentation mask of the first image and a segmentation mask of the second image; generating local homography matrices of the first image with respect to the second image, based on the segmentation mask pairs, the first image, and the second image; and generating a synthetic image obtained by aligning the first image with the second image, wherein the aligning is performed based on the local homography matrices, the segmentation mask pairs, the first image, and the second image.

The first and second image may be images of a scene that includes regions respectively corresponding to the segmentation mask pairs, and each segmentation mask pair's images may both correspond to the segmentation mask pair's region.

The segmenting the first image and the second image may include generating first initial segmentation masks of the first image and second initial segmentation masks of the second image, generating the segmentation mask pairs may include post-processing the first initial segmentation masks and the second initial segmentation masks.

The post-processing may include: determining first segmentation masks according to the first initial segmentation masks and determining a second segmentation masks according to the second initial segmentation masks; selecting N first segmentation masks from the first segmentation masks and selecting N second segmentation masks from the second segmentation masks; merging an unselected first segmentation mask into one of the N first segmentation masks and merging an unselected second segmentation mask into one of the N second segmentation masks; and generating the segmentation mask pairs by performing mask matching between the N first segmentation masks and the N second segmentation masks, wherein each of the first segmentation masks and the second segmentation masks is a segmentation mask of a connected region, and wherein an area of each of the N first segmentation masks and the N second segmentation masks is greater than a first threshold value.

The determining of the first segmentation masks according to the first initial segmentation masks and determining the second segmentation masks according to the second initial segmentation masks may include: in response to a case in which a first segmentation fragment, which is an initial segmentation mask having an area less than a second threshold value, exists among the first initial segmentation masks, filling, among the first initial segmentation masks, the first segmentation fragment using a mask adjacent to the first segmentation fragment and determining each connected region of the first initial segmentation masks to be a first segmentation mask after performing the filling; determining the each connected region of the first initial segmentation masks to be a first segmentation mask in response to a case in which the first segmentation fragment does not exist; in response to a case in which a second segmentation fragment, which is an initial segmentation mask having an area less than the second threshold value, exists among the second initial segmentation masks, filling, among the second initial segmentation masks, the second segmentation fragment using a mask adjacent to the second segmentation fragment and determining each connected region of the second initial segmentation masks to be a second segmentation mask after performing the filling; and determining the each connected region of the second initial segmentation masks to be a second segmentation mask in response to a case in which the second segmentation fragment does not exist, wherein the first threshold value is greater than the second threshold value.

The merging of the unselected first segmentation mask into the one of the N first segmentation masks and merging the unselected second segmentation mask into the one of the N second segmentation masks may include at least one of: in response to a case in which at least one adjacent segmentation mask that is adjacent to the unselected first segmentation mask exists among the N first segmentation masks, merging, in the at least one adjacent segmentation mask, the unselected first segmentation mask into one adjacent segmentation mask that is closest to the unselected first segmentation mask; in response to a case in which an adjacent segmentation mask that is adjacent to the unselected first segmentation mask does not exist among the N first segmentation masks, merging, among the N first segmentation masks, the unselected first segmentation mask into one first segmentation mask that is closest to the unselected first segmentation mask; in response to a case in which at least one adjacent segmentation mask that is adjacent to the unselected second segmentation mask exists among the N second segmentation masks, merging, in the at least one adjacent segmentation mask, the unselected second segmentation mask into one adjacent segmentation mask that is closest to the unselected second segmentation mask; or in response to a case in which an adjacent segmentation mask that is adjacent to the unselected second segmentation mask does not exist among the N second segmentation masks, merging, among the N second segmentation masks, the unselected second segmentation mask into one first segmentation mask that is closest to the unselected second segmentation mask.

A first segmentation mask and a second segmentation mask included in each of the segmentation mask pairs may satisfy the following conditions: the first segmentation mask and the second segmentation mask belong to a same category, have a least distance therebetween, and have an overlap that satisfies a fourth threshold.

The generating of the local homography matrices of the first image with respect to the second image may include generating the local homography matrices by applying a first neural network to the segmentation mask pairs, the first image, and the second image.

The generating of the local homography matrices by applying the first neural network to the segmentation mask pairs, the first image, and the second image, may include: generating an encoding pyramid feature for the first image, based on a feature map of the first image and first segmentation masks in the segmentation mask pairs; generating an encoding pyramid feature for the second image, based on a feature map of the second image and second segmentation masks in the segmentation mask pairs; and predicting the local homography matrices based on the encoding pyramid feature for the first image and the encoding pyramid feature for the second image.

The method may further include: segmenting both a first training image and a second training image of a training image pair and generating a training segmentation mask pairs of the training image pair; and generating the first neural network by training with the training image pair and the training segmentation mask pairs, based on the training segmentation mask pairs of the training image pair, wherein the training segmentation mask pair includes a segmentation mask for one region of the first training image and a segmentation mask for a region corresponding to the one region of the first training image in the second training image.

The segmenting of the first training image and the second training image respectively and the generating the training segmentation mask pairs of the training image pair may include: segmenting the first training image and the second training image respectively from one training image pair and generating initial segmentation masks of the first training image and initial segmentation masks of the second training image; and generating training segmentation mask pairs of the training image pair by post-processing the initial segmentation masks of the first training image and the initial segmentation masks of the second training image.

The generating of the training segmentation mask pairs of the one training image pair by post-processing the initial segmentation masks of the first training image and the initial segmentation masks of the second training image may include: determining a first training segmentation masks of the first training image according to the initial segmentation masks of the first training image and determining a second training segmentation masks of the second training image according to the initial segmentation masks of the second training image; selecting all first training segmentation masks having areas greater than a first threshold value from the first training segmentation masks and selecting all second training segmentation masks having areas greater than the first threshold value from the second training segmentation masks; removing all segmentation masks of a preset category from among the selected first training segmentation masks and the selected second training segmentation masks; and generating the training segmentation mask pairs of the one training image pair by performing mask matching on a remaining first training segmentation mask among all the selected first training segmentation masks after the removing and on a remaining second training segmentation mask among all the selected second training segmentation masks after the removing.

A segmentation mask pair may be formed by determining that a segmentation mask of the first image matches a segmentation mask of the second image.

The generating of the resulting image obtained by aligning the first image with the second image, based on the local homography matrices, the segmentation mask pairs, the first image, and the second image, includes: generating distorted images by applying the respective local homography matrices to the first or second image; and applying weights to the distorted images and fusing the weighted distorted images.

The weights may include a trained weight matrix.

The weight matrix may be trained according to training segmentation mask pairs of a pair of training images.

The training segmentation mask pairs may be formed by merging segment mask fragments having an area that satisfies a threshold.

Each homography matrix may align a region of the first image with a corresponding region of the second image.

One of the segmentation masks in one of the segmentation mask pairs may be formed by merging two initial segmentation masks determined to have a same classification, the classifications of the initial segmentation masks determined from the first or second image.

In another general aspect, an electronic device includes: one or more processors; and memory storing computer-executable instructions configured to cause the one or more processors to: segment both a first image and a second image and generate a segmentation mask pairs, each segmentation mask pair having a segmentation mask of the first image and a segmentation mask of the second image; generate a local homography matrices of the first image with respect to the second image, based on the segmentation mask pairs, the first image, and the second image; and generate a synthetic image obtained by aligning the first image with the second image, wherein the aligning is performed based on the local homography matrices, the segmentation mask pairs, the first image, and the second image.

Other features and aspects will be apparent from the following detailed description, the drawings, and the claims.

Figure 1:
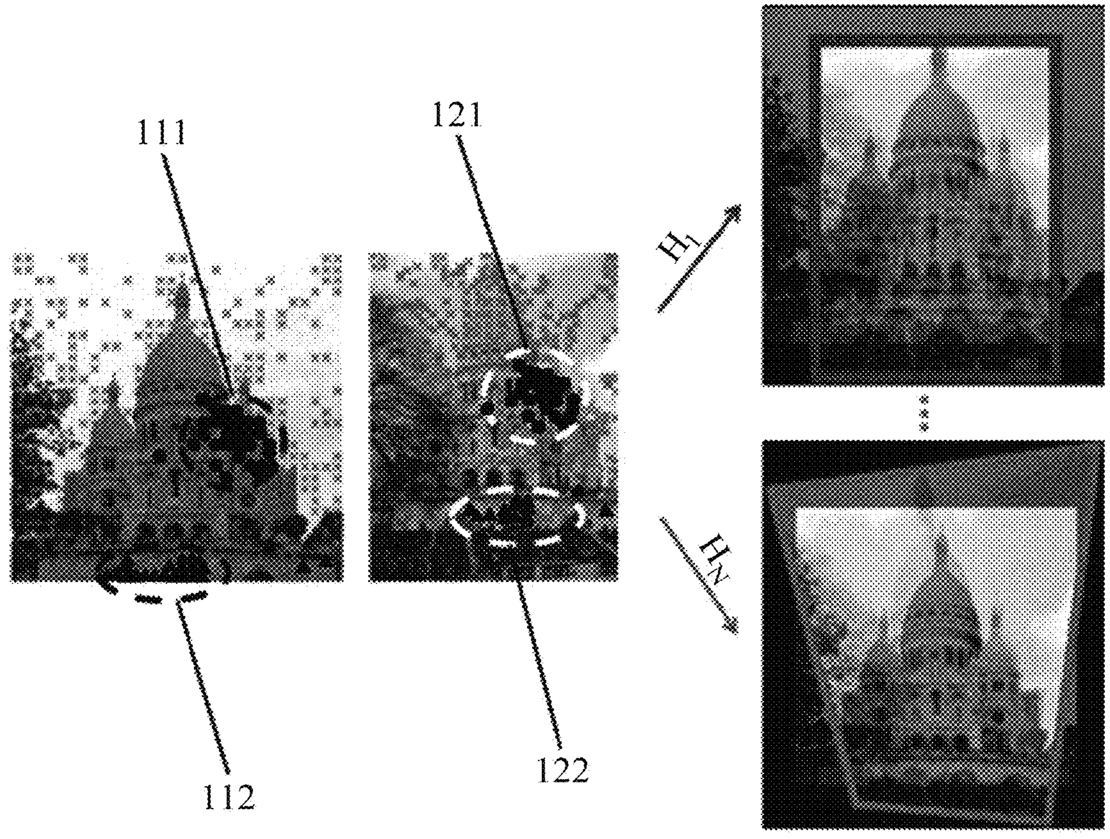
FIG. 1 illustrates an example use of a homography matrix, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example use of a homography matrix, according to one or more embodiments.

Referring to FIG. 1, a homography matrix $H_N$ calculated from regions 112 and 122 may accurately align the lower part of a building but not the upper part of the building, as shown in the lower right image. Likewise, a homography matrix $H_1$ calculated from regions 111 and 121 may accurately align the middle part of the building but not the rest of the building, as shown in the upper right image.

In addition, a global homography matrix predicted by an existing technique generally presents tradeoffs in various planes or the existing technique focuses on the main plane and does not consider or solve discrepancies due to plane parallax.

Embodiments and examples described herein may obtain a segmentation mask of an image through an unsupervised segmentation algorithm, predicting local homography matrices that are accurate for respective different planes by considering plane parallax problems, and obtaining a fused image based on the predicted local homography matrices, where the fused image is accurate for different planes. Hereafter, this is described with reference to FIGS. 2 to 14.

Figure 2:
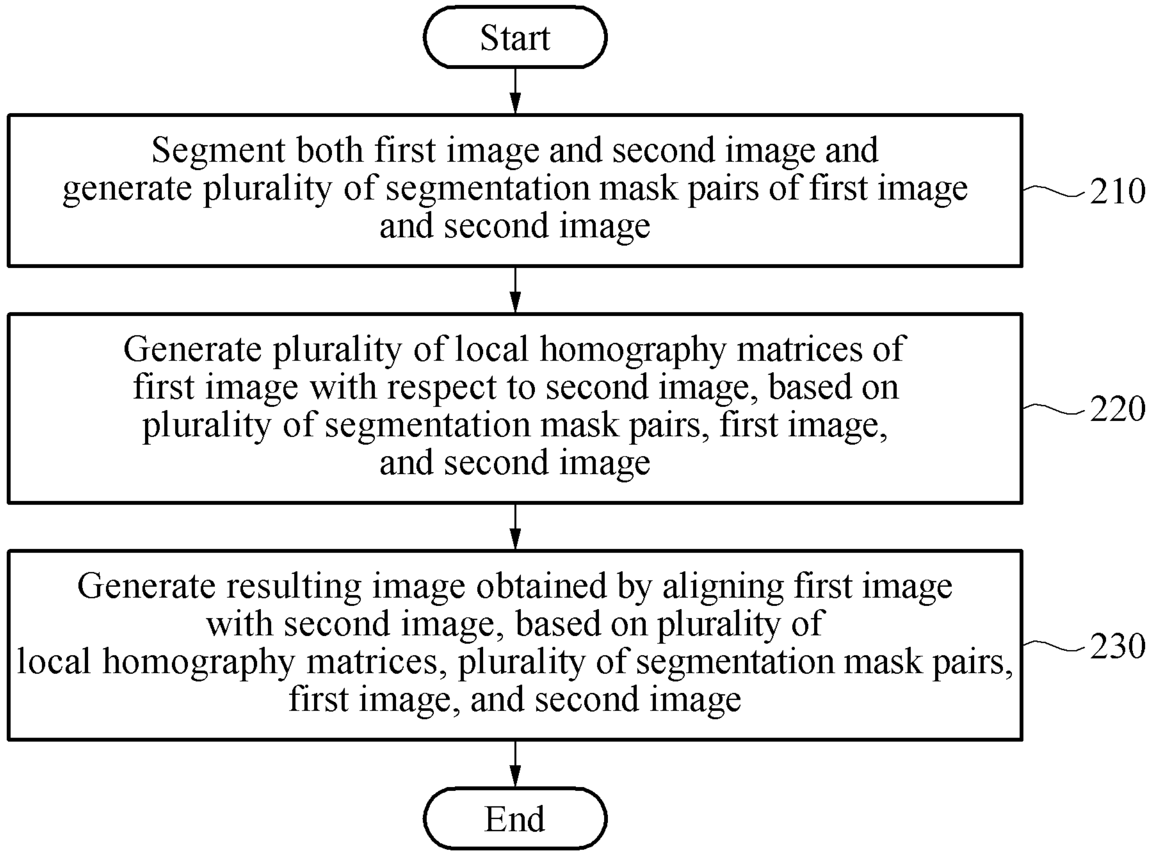
FIG. 2 illustrates an example image processing method, according to one or more embodiments.

FIG. 2 illustrates an example image processing method, according to one or more embodiments.

Figure 3:
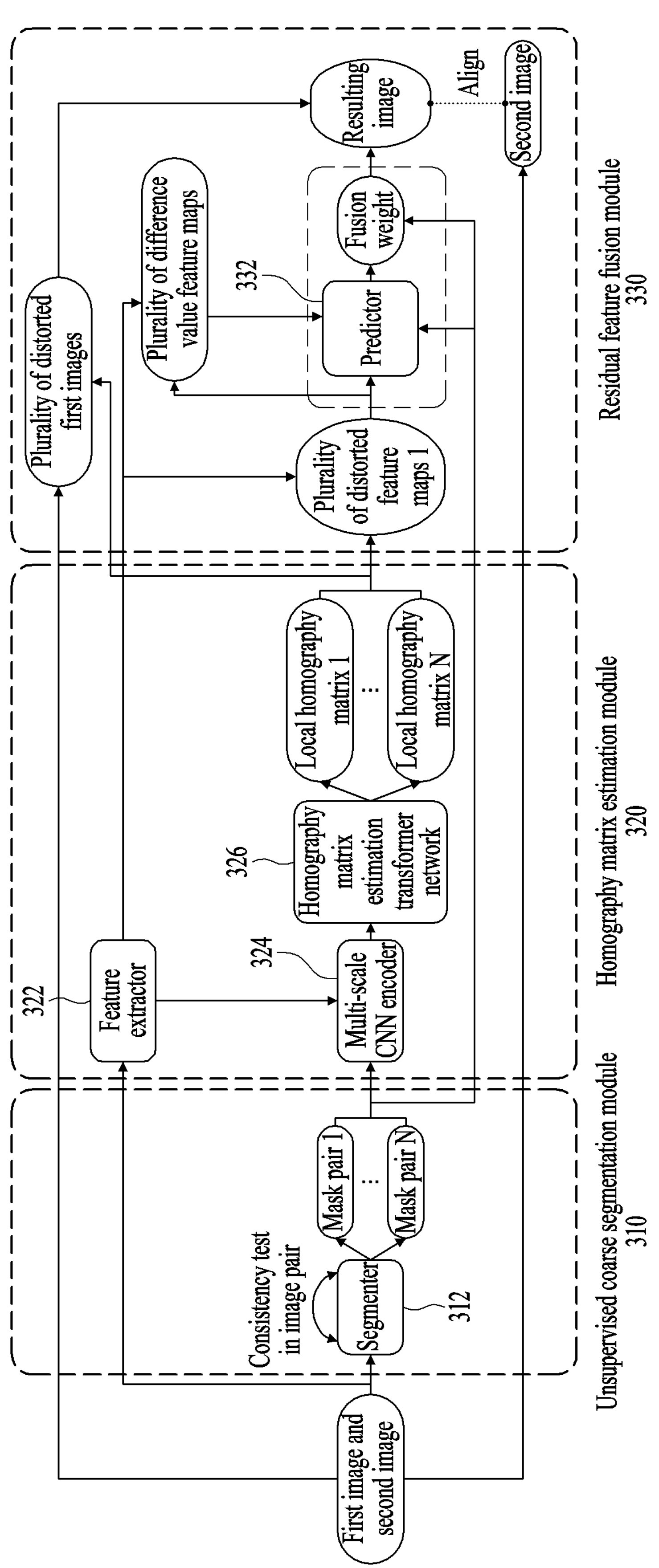
FIG. 3 illustrates example structure of an image processing architecture, according to one or more embodiments.

FIG. 3 illustrates an example structure of an image processing architecture, according to one or more embodiments.

Figure 4:
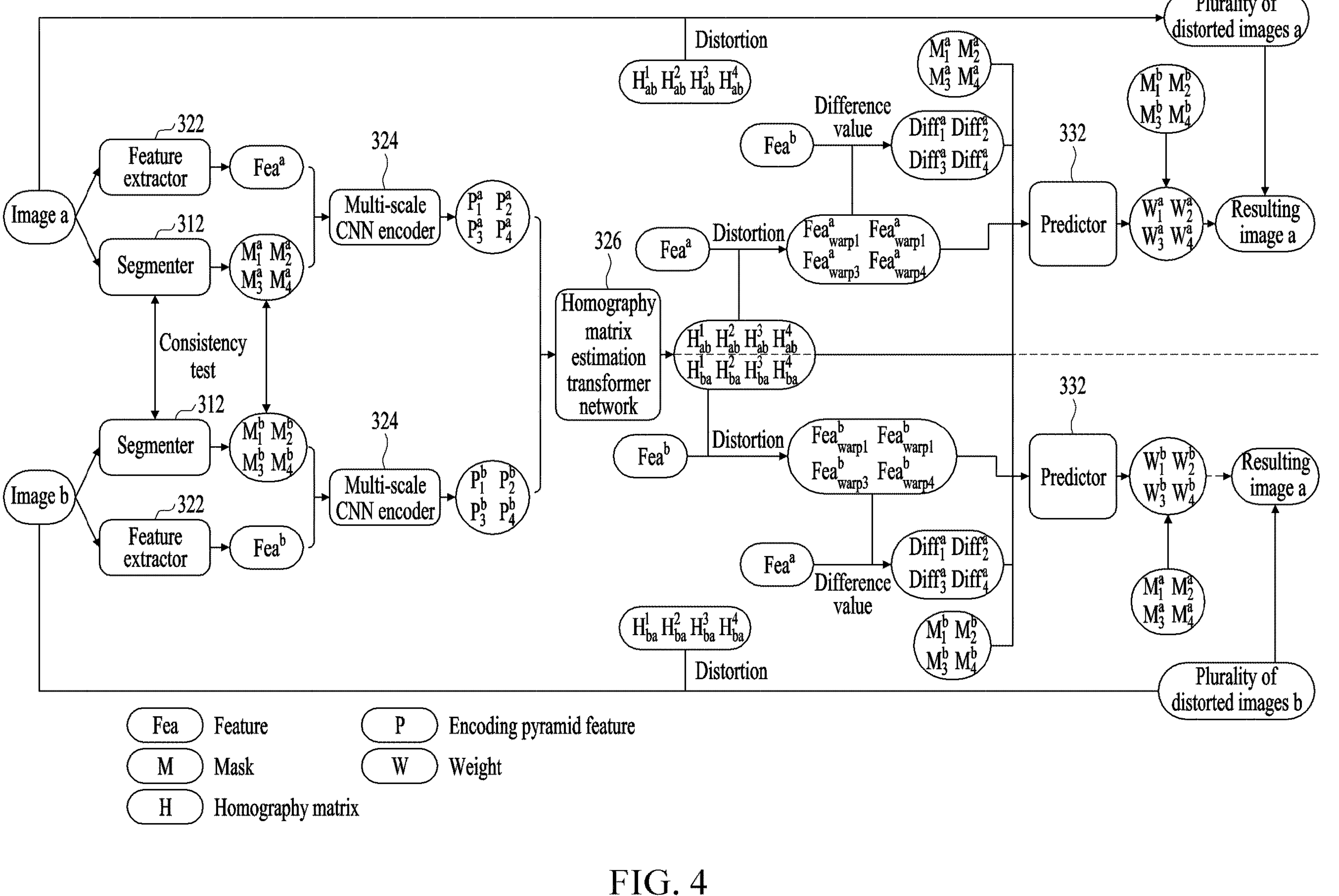
FIG. 4 illustrates a detailed example of an image processing architecture, according to one or more embodiments.

FIG. 4 illustrates a detailed example of an image processing architecture, according to one or more embodiments.

Figure 5A:
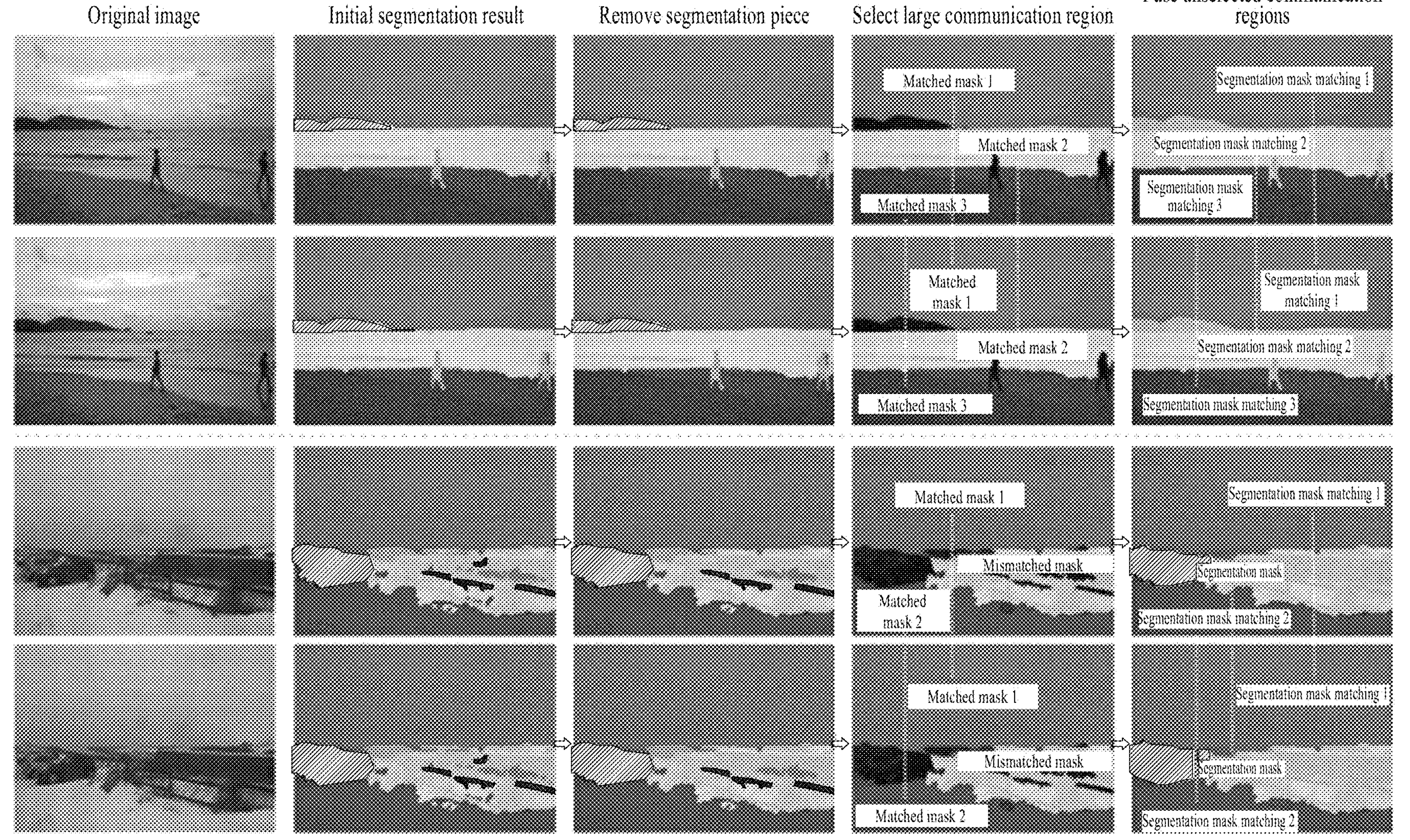
FIG. 5A illustrates an example of obtaining a segmentation mask, according to one or more embodiments.

FIG. 5A illustrates an example of obtaining a segmentation mask, according to one or more embodiments.

Referring to FIG. 3, an image processing method may be performed by an unsupervised coarse segmentation module 310, a homography matrix estimation module 320, and a residual feature fusion module 330. The unsupervised coarse segmentation module 310, the homography matrix estimation module 320, and the residual feature fusion module 330 are descriptive of an image processing apparatus configured to perform the image processing method.

Referring to FIG. 2, in operation 210, a first image and a second image may both be segmented, and segmentation mask pairs of the first image and the second image may be generated. Each segmentation mask pair may include (i) a first segmentation mask for a first region of the first image and (ii) a second segmentation mask for a second region of the second image, the second region corresponding to the first region. Operation 210 may be performed by the unsupervised coarse segmentation module 310 of FIG. 3.

The unsupervised coarse segmentation module 310 may find a regional correlation between the first image and the second image, and the regional correlation may be characterized as two corresponding regions in the first image and the second image are approximated by a local homography matrix (multiple correlations may be found). A region correspondences may include be found for physical planes (e.g., ground, lake surface, etc.), and region correspondences may be found for scene features that are not strictly planar but which are approximately planar, for example, a series of distant buildings or mountains, a group of clouds, etc.

It may be assumed that $\mathcal{C}o\mathcal{S}eg$ represents the unsupervised coarse segmentation module 310 and that I, M, H, and $num^H$ represent, respectively: an image, a mask, a homography matrix, and the number of homography matrices. Accordingly, assuming that $(I^a,I^b)$ denotes an image pair, $I^a$ denotes a first image a, and $I^b$ denotes a second image b, a process of generating the aforementioned segmentation mask pairs, as represented by the image pair $(I^a,I^b)$, may be as expressed by Equation 1 below through the unsupervised coarse segmentation module 310 $\mathcal{C}o\mathcal{S}eg$.

$$(\mathcal{M}^a, \mathcal{M}^b) = \left(\{M_i^a\}_{i=1}^{num^H}, \{M_i^b\}_{i=1}^{num^H}\right) = CoSeg(I^a, I^b) \quad \text{Equation 1}$$

Here, $\mathcal{M}^a$ denotes a set of segmentation masks of the first image a, $\mathcal{M}^b$ denotes a set of segmentation masks of the second image b, and ($\mathcal{M}^a$ $\mathcal{M}^b$) denotes a set of segmentation mask pairs of the first image a and the second image b. Here, the number of homography matrices $num^H$ may be a settable hyperparameter. For example, the number of homography matrices $num^H$ be set to 4, but the present disclosure is not limited thereto. A process by which the unsupervised coarse segmentation module 310 determines the set of segmentation mask pairs ($\mathcal{M}^a$, $\mathcal{M}^b$) of the first image a and the second image b is described next.

Specifically, the unsupervised coarse segmentation module 310 $\mathcal{C}o\mathcal{S}eg$ may respectively segment the first image a and the second image b and to generate first initial segmentation masks of the first image a and second initial segmentation masks of the second image b.

As shown in FIG. 3, the first image and the second image may be input to the unsupervised coarse segmentation module 310 and may be respectively initially segmented by a segmenter 312 of the unsupervised coarse segmentation module 310 using any unsupervised segmentation method; all methods of segmenting an image and obtaining segmentation masks may be applied to this initial segmentation.

Regarding segmentation, referring to the examples in FIG. 5A, the horizontal dashed lines separates two examples. Image squares in FIG. 5A will be referenced by indexing the upper left square as (1,1) and the lower right square as (5,4). The top two rows (row 1 and row 2) are a first image-pair example (example 1), with row 1 corresponding to a first image in the first-image pair. The bottom two rows (row 3 and row 4) are a second image-pair example (example 2), with row 3 corresponding to the first image of the second image-pair and row 4 corresponding to the second image of the second image-pair. Row 1 shows the original images of each example image-pair. Row 2 shows initial image segmentation results (in the form of mask images) of the original images. That is, the mask images in column 2 may include the initial segmentation masks noted above. In other words, the unsupervised coarse segmentation module 310 may generate first initial segmentation masks of the first image in an image-pair and second initial segmentation masks of the second image in an image-pair.

In addition, the unsupervised coarse segmentation module 310 may obtain the first initial segmentation masks of the first image of an image-pair and the second initial segmentation masks of the second image of the image-pair and then obtain segmentation mask pairs by post-processing the first and second initial segmentation masks. Since the segmentation method may be unsupervised, the first and second initial segmentation masks may be less accurate in some regions and some mask fragments (small or extraneous segment masks) may exist. Accordingly, the segmentation method may be followed with post-processing on the initial segmentation result to obtain available segmentation mask pairs.

As shown in FIG. 3, in the unsupervised coarse segmentation module 310, the segmentation mask pairs, for example, segmentation mask pairs 1 to N, may be generated by post-processing the first and second initial segmentation masks. Each of the segmentation mask pairs may include a first segmentation mask for a first region of the first image and a second segmentation mask for a second region in the second image, where the first region corresponds to the second region (e.g., both may correspond to a same portion of a scene in the first and second images). This is described with reference to FIGS. 4, 5A, and 6.

Figure 6:
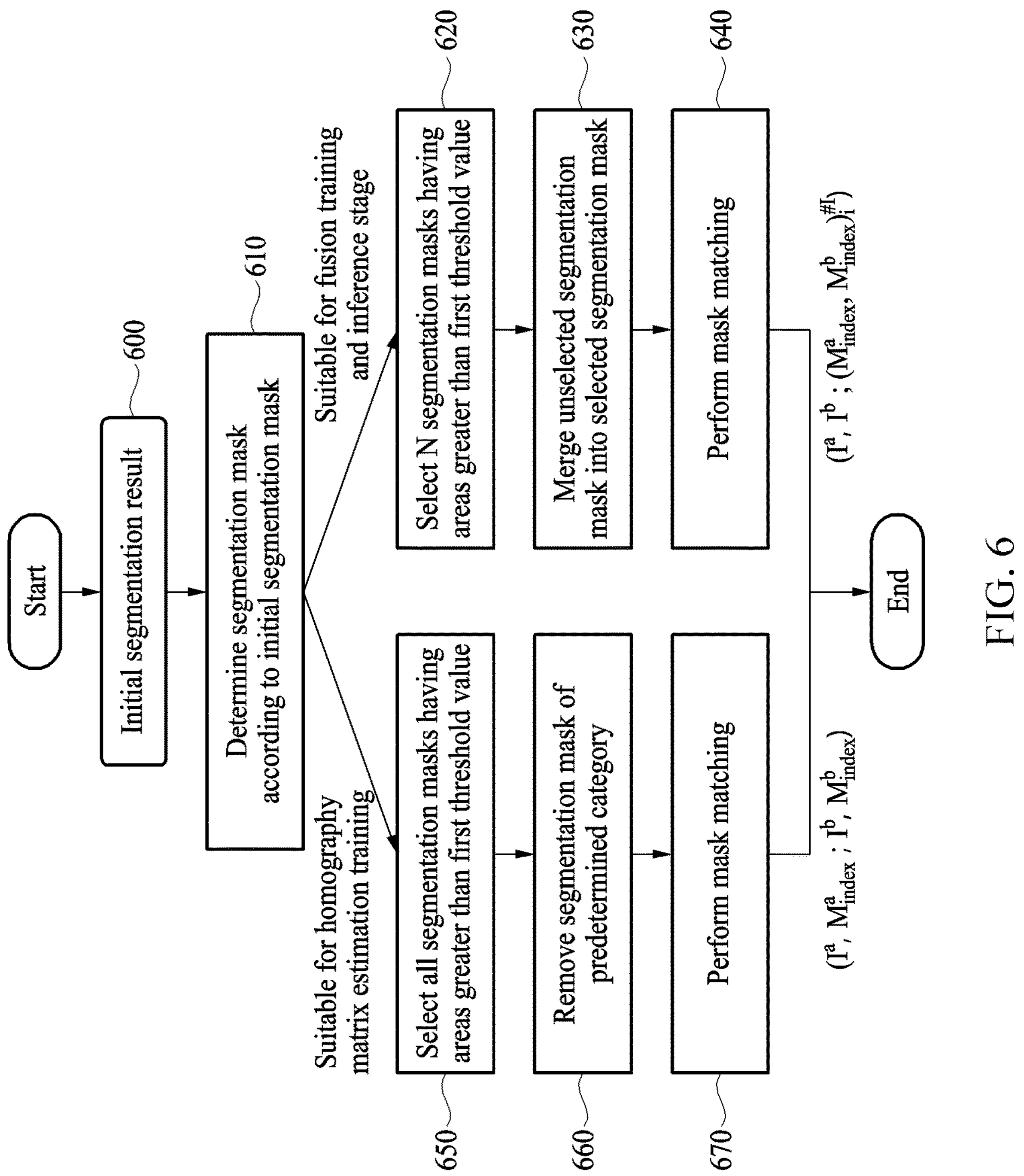
FIG. 6 illustrates an example of post-processing an initial segmentation mask, according to one or more embodiments.

FIG. 6 illustrates an example of post-processing an initial segmentation mask, according to one or more embodiments.

The post-processing may be performed slightly differently on an initial segmentation mask before training (or final inferencing) of the homography matrix estimation module 320 and the residual feature fusion module 330. Throughout, depending on context, descriptions of operations on, or involving, a region, mask, matrix, pair, or other such element in the singular may be representative of operations of all of the elements in a set or plurality thereof.

In the training of the homography matrix estimation module 320 (left branch of FIG. 6), more rigorous initial-mask post-processing may be performed to generate more accurate segmentation mask pairs. That is, the training of the homography matrix estimation module 320 may focus on a meaningful and reliable region to determine a corresponding local homography matrix. Regarding meaningful regions, overall, a segmentation mask having a larger region may be selected for different segmentation classes and a segmentation error may be corrected depending on mask matching (e.g., according to a difference between masks of a pair), whereas an initial segmentation mask that is too small or without a corresponding matching mask may be excluded from initial segmentation mask post-processing before training the homography matrix estimation module 320.

However, in the training or final inference stage of the residual feature fusion module 330 (right branch of FIG. 6), a set of segmentation mask pairs, which is larger (referring to the areas of individual masks), more connectable, and better covers the entire image, may be generated through more generous post-processing. This set of segmentation masks may enable a more natural fusion in varying mask regions (e.g., localized fusion). It may be generally assumed that a segmentation mask with insufficient reliability (for the purpose of calculating a homography matrix) is more likely to share the same local homography matrix with an adjacent segmentation mask.

To illustrate these ideas, consider the examples of FIG. 5A. As shown in columns 4 and 5 of example 1 (rows 1 and 2), referring to the segmentation mask pair of the sea only (matched mask 2 of the first/top example), this pair may be used when training the local homography matrix estimation module 320 (column 4). On the other hand, in the training or final inference stage of the residual feature fusion module 330, a larger segmentation mask pair (larger masks) corresponding to the same local homography matrix may be formed by merging (i) another segmentation mask having a smaller area (e.g., segmentation masks of a distant mountain and human) near the segmentation mask pair of the sea into (ii) a segmentation mask of the sea. This is described in detail below.

Referring to FIG. 6, operations 610 and 620 to 640 on the right side of the diagram, may be used to (i) obtain segmentation mask pairs used for inference (or prediction) of a first neural network (e.g., of the homography matrix estimation module 320) and a second neural network (e.g., predictor 332) or may be used to (ii) obtain training segmentation mask pairs used for training the second neural network (not the first); in both cases the pairs may be obtained by post-processing the initial segmentation mask. Operations 610 and 650 to 670 on the left side of the diagram may be used to obtain training segmentation mask pairs used for training the first neural network by post-processing the initial segmentation mask.

As shown in FIG. 6, in operation 610, the image processing method may determine first segmentation masks according to first initial segmentation masks and may determine a second segmentation masks according to second initial segmentation masks. Here, each of the first segmentation masks and the second segmentation masks may be connected to a same region. That is, the image processing method may determine the segmentation mask according to the initial segmentation mask.

Specifically, when the first segmentation masks are determined from the first initial segmentation masks and when a first segmentation fragment (which is an initial segmentation mask having an area less than a second threshold value) exists among the first initial segmentation masks, the image processing method may fill, among the first initial segmentation masks, a first segmentation fragment using a mask adjacent to the first segmentation fragment and may determine each such connected region of the first initial segmentation masks to be (and become) a first segmentation mask after performing the filling. In other words, one segmentation mask that is small and adjacent to another segmentation mask may be merged to the other segmentation mask.

In addition, when an initial segmentation mask (the first segmentation fragment) having an area less than the second threshold value does not exist among the first initial segmentation masks, the image processing method may determine each communication region of the first initial segmentation masks to be a first segmentation mask.

In addition, when a second segmentation fragment, which is an initial segmentation mask having an area less than the second threshold value, exists among the second initial segmentation masks, the image processing method may fill, among the second initial segmentation masks, the second segmentation fragment using a mask adjacent to the second segmentation fragment and may determine each connected region of the second initial segmentation masks to be a second segmentation mask after performing the filling.

Additionally, when an initial segmentation mask (the second segmentation fragment) having an area less than the second threshold value does not exist among the second initial segmentation masks, the image processing method may determine each communication region of the second initial segmentation masks to be a second segmentation mask. This is to ensure that the finally obtained segmentation mask is more advantageous for estimating the local homography matrix.

Here, the second threshold value may be set to, as non-limiting examples, areas of 500, 550, or 600 pixels. That is, when areas of some initial segmentation masks are less than 500 pixels in the initial segmentation result, such masks may be considered as a segmentation fragment and may need to be removed. That is, a corresponding segmentation fragment may be merged into the/a remaining initial segmentation mask. For example, a corresponding segmentation fragment may be merged into an adjacent initial segmentation mask. Specifically, a corresponding initial segmentation mask may be filled (or added to) using a mask adjacent to the corresponding segmentation fragment. Here, "segmentation fragment" refers to an initial segmentation mask with an area smaller than the second threshold value and possibly isolated. Accordingly, "first segmentation fragment" refers to an initial segmentation mask, among the first initial segmentation masks generated from a first image, that has an area less than the second threshold value. Additionally, "second segmentation fragment" refers to an initial segmentation mask, among the second initial segmentation masks generated from a second image, that has an area less than the second threshold value.

The image processing method may then determine each connected region of the first initial segmentation masks to be one first segmentation mask after performing the filling. As shown in the examples of FIG. 5A, some initial segmentation masks (i.e., segmentation fragments) having areas less than the second threshold value may exist in the initial segmentation result in row 1, column 2 and the initial segmentation result in row 2, column 2.

The image processing method may generate a segmentation result shown in row 1, column 3 and a segmentation result shown in row 2, column 3 when the initial segmentation mask having an area less than the second threshold value is removed (i.e., merged into the remaining initial segmentation masks). In addition, the image processing method may determine each connected region of the segmentation result in row 1, column 3 to be one first segmentation mask and may determine each connected region of the segmentation result in row 2, column 3 to be one second segmentation mask. Specifically, the unsupervised segmentation method may obtain one initial segmentation mask for each category when the first initial segmentation masks and the second initial segmentation masks are obtained by initially segmenting the first image and the second image using any currently known unsupervised segmentation method. Accordingly, for example, when three trees exist in a single image, the unsupervised segmentation method may generate one initial segmentation mask of a tree category for the three trees, which is a result obtained by initially segmenting the single image. That is, in the unsupervised segmentation method, one initial segmentation mask of the tree category may actually include three segmentation masks, and each segmentation mask may correspond to one category—the tree category.

In operation 620, the image processing method may select N first segmentation masks from the first segmentation masks and may select N second segmentation masks from the second segmentation masks. Here, an area of each of the selected N first segmentation masks and the selected N second segmentation masks may be greater than a first threshold value, the first threshold value may be greater than the second threshold value, and N may be less than or equal to the number of homography matrices $num^H$.

Specifically, after operation 610, the image processing method may order the first and second segmentation masks in descending order of areas, select the top-N first segmentation masks having areas greater than the first threshold value from among the ordered first segmentation masks, and select the top-N second segmentation masks having areas greater than the first threshold value from among the ordered second segmentation masks.

The first threshold value may be set to, for example, areas of 9,000, 10,000, or 11,000 pixels, to name some non-limiting examples. In the example shown in FIG. 5A, the image processing method selects three segmentation masks having areas greater than the first threshold value from the segmentation masks of row 1, column 3 and row 2, column 3, that is, a segmentation mask of the sky, a segmentation mask of the sea, and a segmentation mask of the beach, but a segmentation mask of the mountain and a segmentation mask of the human may not be selected, so a result shown in row 1, column 4 and a result in row 2, column 4 may be generated. An unselected segmentation mask in row 1, column 4 and an unselected segmentation mask in row 2, column 4 of FIG. 5A shown as black.

In operation 630, the image processing method may merge an unselected first segmentation mask into one of the N first segmentation masks and may merge an unselected second segmentation mask into one of the N second segmentation masks. However, when performing merging in operation 630, for each previously unselected first segmentation mask, the image processing method may need to determine which of the N first segmentation masks the previously unselected first segmentation mask is to be merged into.

To this end, the image processing method may, for a given (representative unselected first segmentation mask, determine whether there is segmentation mask among the N first segmentation masks that is adjacent to the given unselected first segmentation mask, and when so determined, the image processing method may merge the given unselected first segmentation mask into the adjacent segmentation mask. When there are multiple adjacent segmentation masks, the adjacent segmentation mask closest to the centerpoint distance from the given unselected first segmentation mask. In addition, when there is no adjacent segmentation mask among the N first segmentation masks, the image processing method may merge the given unselected first segmentation mask into a non-adjacent first segmentation mask among the N first segmentation masks whose centerpoint is closest to the given unselected first segmentation mask's centerpoint (i.e., the one with the smallest centerpoint distance). By the same process, for the second image, for an unselected second segmentation mask of each connected region, a given unselected second segmentation mask may be merged into one of the N second segmentation masks selected by operation 620.

As shown in FIG. 5A, both the segmentation mask of the mountain and the segmentation mask of the human may be unselected segmentation masks, and the unselected segmentation mask of the mountain may be merged into the segmentation mask of the sea. For example, as shown in row 1, column 5 and row 2, column 5 of FIG. 5A, the unselected segmentation mask of the human may be merged into the segmentation mask of the sea.

In operation 640, the image processing method may generate the segmentation mask pairs by performing mask matching on the N first segmentation masks (of the first image) and the N second segmentation masks (of the second image). Specifically, as shown in FIG. 4, the image processing method may generate the segmentation mask pairs by performing mask matching (i.e., a consistency test) on the N first segmentation masks and the N second segmentation masks. As shown in FIG. 4, for example, assuming that N is 4, the image processing method may have generated four segmentation masks $$\{M_1^a, M_2^a, M_3^a, M_4^a\}$$

for the first image and four segmentation masks $$\{M_1^b, M_2^b, M_3^b, M_4^b\}$$

for the second image through the segmenter 312.

Specifically, the first segmentation mask and the second segmentation mask included in each segmentation mask pair may satisfy conditions (i.e., mask matching references) in which the first segmentation mask and the second segmentation mask (i) belong to a same category, (ii) have the smallest centerpoint distance that is also below a third threshold, and (iii) have an area difference (non-overlap area) ratio (e.g., Intersection over Union (IoU)) that is less than a fourth threshold.

When the first image and the second image are respectively segmented using the unsupervised segmentation method, the image processing method may generate a category (e.g., a mountain category, sea category, traffic category, animal category, human category, exercise category, etc.) of each initial segmentation mask and accordingly assign a category number thereto. To match two segmentation masks, the two segmentation masks must belong to the same category (e.g., the two matched segmentation masks belong to the sea category), have the smallest centerpoint distance that is below the third threshold, and have an area difference (in terms of overlap) ratio less than the fourth threshold. For example, the third threshold value may be 10 or 15 pixels and the fourth threshold value may be 15%.

Figure 5B:
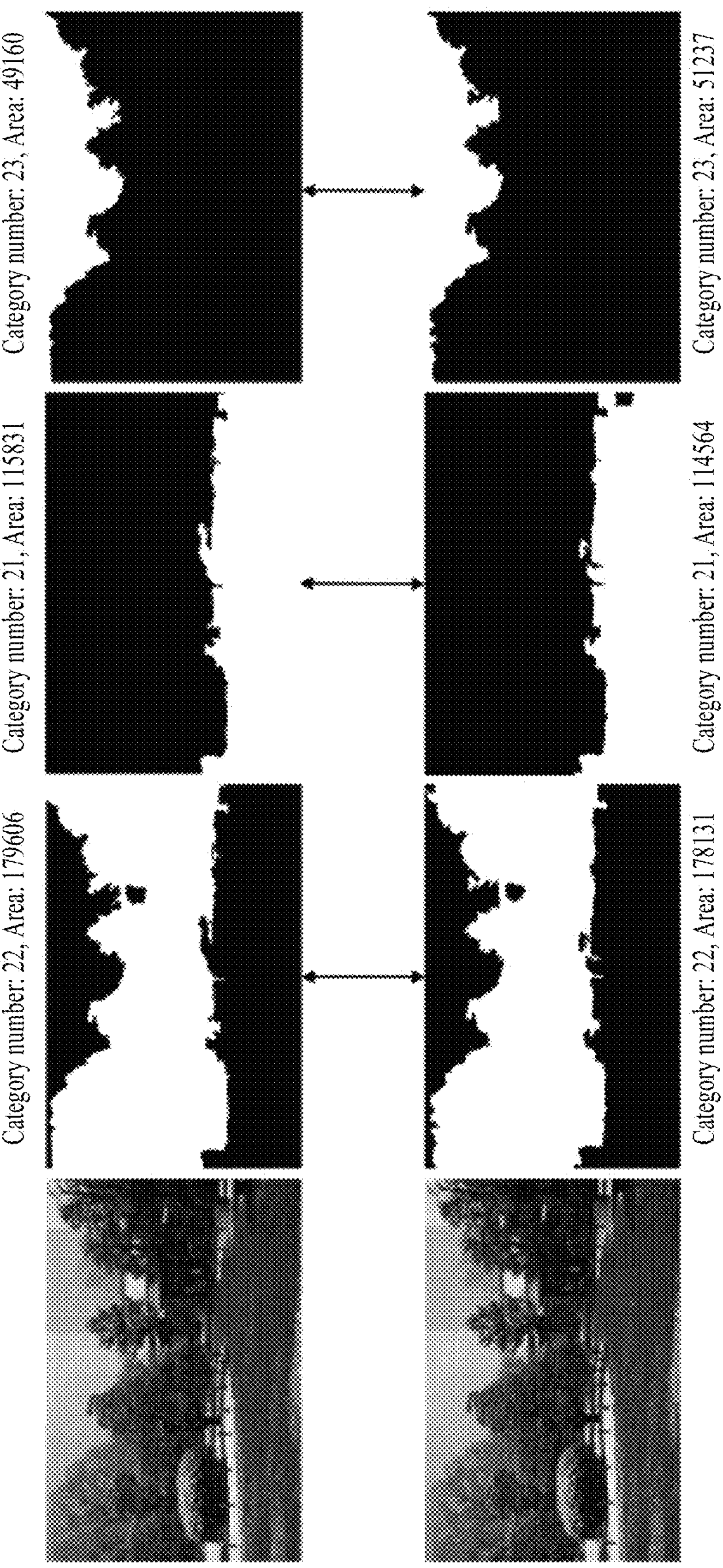
FIG. 5B illustrates an example of mask matching, according to one or more embodiments.

FIG. 5B illustrates an example of mask matching, according to one or more embodiments. FIG. 5B shows different mask pairs for a pair of input images.

In the example, shown in FIG. 5B, the category numbers of two segmentation masks in column 2 are both 22 (i.e., the tree category) and the areas are 179,606 pixels and 178,131 pixels, respectively. The category numbers of two segmentation masks in column 3 are both 21 (i.e., the road category) and the areas are 115,831 pixels and 114,564 pixels, respectively. The category numbers of two segmentation masks in column 4 are both 23 (i.e., the sky category) and the areas are 49,160 pixels and 51,237 pixels, respectively. As described above, it may be seen that two segmentation masks in the same column match each other as a segmentation mask pair they have the same category, have an area difference ratio less than the fourth threshold, and actually have the smallest centerpoint distance that is less than the third threshold.

As shown in FIG. 5A, the image processing method may determine a segmentation mask pair matched from the N first segmentation masks and the N second segmentation masks through operation 610 and operations 620 to 640. In FIG. 5A, segmentation mask 1, segmentation mask 2, and segmentation mask 3 in row 1, column 5 may match segmentation mask 1, segmentation mask 2, and segmentation mask 3 in row 2, column 5, respectively.

As shown in FIG. 5A, a first image in row 3, column 1 and a second image in row 4, column 2 may form one image pair, and the first image and the second image of an image pair may be respectively segmented using the currently known unsupervised segmentation method and may generate the first initial segmentation masks of the first image and the second initial segmentation masks of the second image. Then, as a result of performing operation 610 and operations 620 to 640, when first segmentation masks and second segmentation masks that do not match exist, the image processing method may form a single segmentation mask by combining the unmatched first segmentation masks, form a single segmentation mask by combining the unmatched second segmentation masks; the resulting segmentation masks may be processed using a global homography matrix during an image fusion process.

The image processing method may generate the segmentation mask pairs by post-processing the first initial segmentation masks and the second initial segmentation masks through operation 610 and operations 620 to 640 of FIG. 6. Here, each of the segmentation pairs may characterize a regional correlation in an image pair of the first image and the second image. In addition, the final output of the post-processing process in operation 610 and operations 620 to 640 may be an image pair $$(I^a, M_{index}^a; I^b, M_{index}^b)$$

that actually includes the segmentation mask pairs. Here, as shown in FIG. 6, $$M_{index}^a$$

represents a segmentation mask indexed by the index in the first image $I^a$ and $$M_{index}^b$$

represents a segmentation mask indexed by the index in the second image $I^b$.

The image processing method may implement more rigorous or more generous post-processing of the initial segmentation mask by setting different values for the first threshold value, the second threshold value, the third threshold value, and the fourth threshold value.

Referring back to FIG. 2, in operation 220, the image processing method may generate local homography matrices of the first image with respect to the second image, and may do so based on the segmentation mask pairs, the first image, and the second image. Operation 220 may be performed by the homography matrix estimation module 320 of FIG. 3. The homography matrix estimation module 320 may predict local homography matrices that are accurate for different planes based on the segmentation mask pairs. Here, the segmentation mask pairs may characterize regional correlations in an image pair and may help accurately handle parallax problems caused by planes.

With the homography matrix estimation module 320 represented by $\mathcal{H}omo$, a process of generating the local homography matrices of the first image $I^a$ with respect to the second image $I^b$ may be expressed as Equation 2 below through the homography matrix estimation module 320 $\mathcal{H}omo$.

$$\mathcal{H}_{local}^{ab} = \{H_{local_i}^{ab}\}_{i=1}^{num^H} = \mathcal{H}omo(I^a, I^b; \mathcal{M}^a, \mathcal{M}^b) \quad \text{Equation 2}$$

Here, $$H_{local}^{ab}$$

denotes one local homography matrix of the first image $I^a$ with respect to the second image $I^b$ and $$\mathcal{H}^{ab}_{local}$$

denotes a set of local homography matrices (i.e., local homography matrices) of the first image $I^a$ with respect to the second image $I^b$. Described next is a process in which homography matrix modules generate the local homography matrices $$\mathcal{H}^{ab}_{local}$$

of the first image $I^a$ with respect to the second image $I^b$.

Specifically, the first image, the second image, and the segmentation mask pairs of the first image and the second image may be input to the homography matrix estimation module 320, and the first neural network thereof may then generate the local homography matrices based on the segmentation mask pairs, the first image, and the second image. The first neural network may include a feature extractor 322, a multi-scale convolutional neural network (CNN) encoder 324, and a homography matrix estimation transformer network 326, as shown in FIG. 3. The feature extractor 322 may be based on (e.g., a form of or implementation of) a recurrent neural network (RNN), CNN, or transformer model, to name some non-limiting examples. In addition, the homography matrix estimation transformer network 326 may be an adaptation of, for example, a transformer model, which may include a cascade of a self-attention encoder block and a pseudo-attention decoder block. Additionally, compared to a CNN-based model, a query-key correlation of the transformer model may set a good quality local correspondence relationship for homography matrix estimation. Hereinafter, operation 220 is described in detail with reference to FIG. 7.

Figure 7:
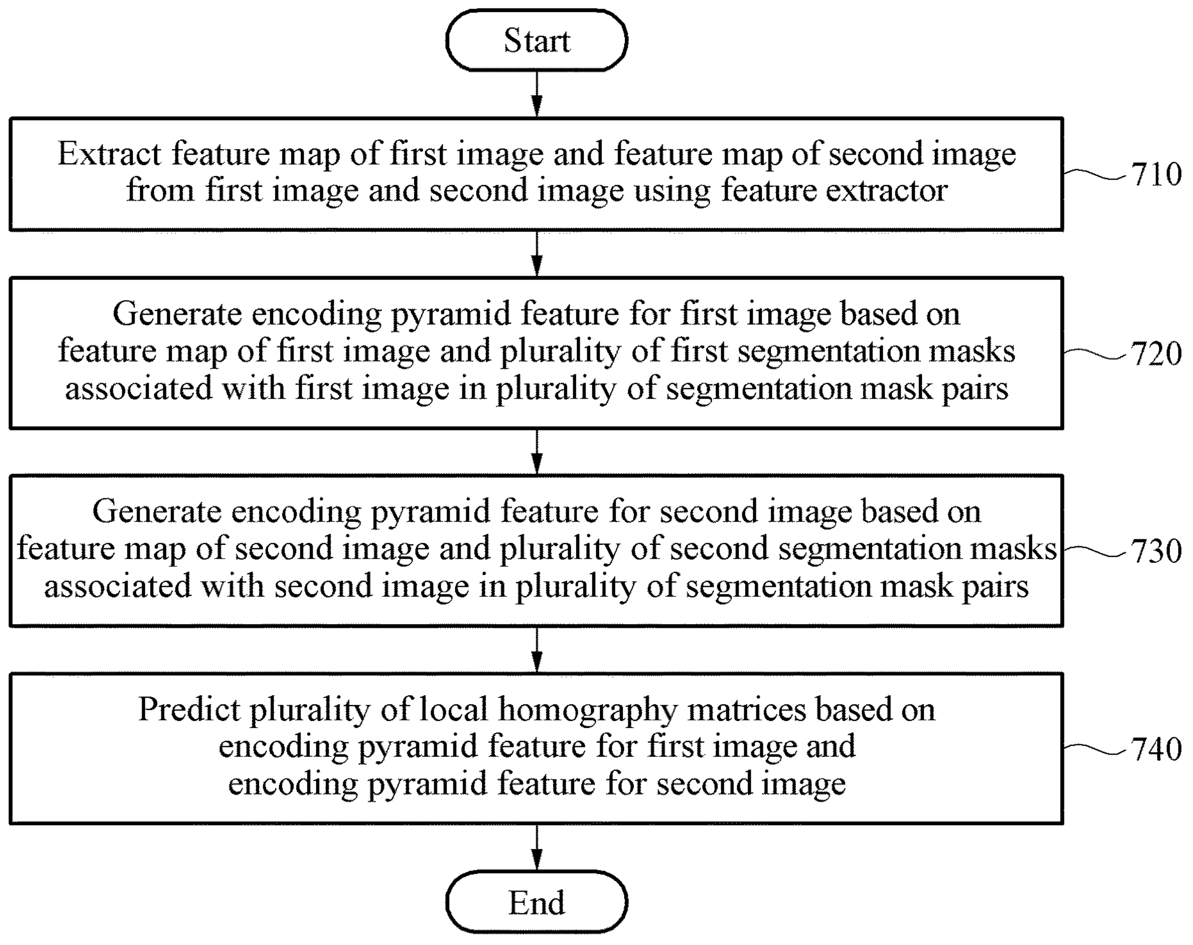
FIG. 7 illustrates an example of obtaining a set of local homography matrices of a first image with respect to a second image, the obtaining based on a set of segmentation mask pairs, the first image, and the second image, according to one or more embodiments.

FIG. 7 illustrates an example of obtaining local homography matrices of a first image with respect to a second image, based on segmentation mask pairs, the first image, and the second image, according to one or more embodiments.

As shown in FIG. 7, in operation 710, the image processing method may extract a feature map of (and from) the first image and a feature map of (and from) the second image using the feature extractor 322.

Specifically, as shown in FIG. 3, the first image and the second image may be input to the feature extractor 322 which may extract the feature map of/from the first image (e.g., a feature map $Fea^a$ of FIG. 4) and may extract the feature map of/from the input second image (e.g., a feature map $Fea^b$ of FIG. 4).

In operation 720, the image processing method may generate an encoding pyramid feature for the first image based on the feature map of the first image and based on first segmentation masks associated with the first image in the segmentation mask pairs.

Similarly, in operation 730, the image processing method may generate an encoding pyramid feature for the second image based on the feature map of the second image and based on second segmentation masks associated with the second image in the segmentation mask pairs.

Specifically, as shown in FIG. 3, the feature map of the first image and the feature map of the second image may be both input (details at the end of this paragraph) to the multi-scale CNN encoder 324 of the homography matrix estimation module 320 together with the segmentation mask pairs (e.g., N segmentation mask pairs) obtained by the unsupervised coarse segmentation module 310 (as post-processed). Regarding the first image, the multi-scale CNN encoder 324 may generate feature maps (e.g., an encoding pyramid) whose sizes are proportionally adjusted at different levels, by performing an encoding operation based on the feature map of the first image and the first segmentation masks associated with the first image in the segmentation mask pairs. More specifically, the multi-scale CNN encoder 324 may obtain the encoding pyramid feature for the first image, and the encoding pyramid feature for the first image may be used for coarse-to-fine homography estimation. Similarly, the multi-scale CNN encoder 324 may perform an encoding operation based on the feature map of the second image and the second segmentation masks associated with the second image in the segmentation mask pairs, and thus generate an encoding pyramid feature for the second image. The encoding operations may be performed by the same multi-scale CNN encoder 324, first for the first image and then for the second image, or the encoding may be performed in parallel by the two identical multi-scale CNN encoders 324.

Specifically, as shown in FIG. 4, an encoding pyramid feature $$\{P_1^a, P_2^a, P_3^a, P_4^a\}$$

for the first image may be generated by multiplying the first segmentation masks associated with the first image in the segmentation mask pairs by the feature maps of the first image extracted by the feature extractor 322, respectively, merging fragments of information of the segmentation mask pairs, and then inputting and encoding the multiplication result to the multi-scale CNN encoder 324. Likewise, an encoding pyramid feature $$\{P_1^b, P_2^b, P_3^b, P_4^b\}$$

for the second image may be generated by multiplying the second segmentation masks associated with the second image in the segmentation mask pairs by the feature maps of the second image extracted by the feature extractor 322, respectively, and inputting and encoding the multiplication result to the multi-scale CNN encoder 324.

In operation 740, the image processing method may predict the local homography matrices based on the encoding pyramid feature for the first image and the encoding pyramid feature for the second image.

Specifically, as shown in FIG. 3, when local homography matrices of the first image with respect to the second image are predicted, the image processing method may predict the local homography matrices of the first image with respect to the second image by stitching the encoding pyramid feature for the first image in front of the encoding pyramid feature for the second image and then inputting the stitched encoding pyramid feature to the homography matrix estimation transformer network 326.

Specifically, as shown in FIG. 4, the image processing method may generate homography matrices $$\{H_{ab}^1, H_{ab}^2, H_{ab}^3, H_{ab}^4\}$$

of the first image with respect to the second image by stitching the encoding pyramid feature $$\{P_1^a, P_2^a, P_3^a, P_4^a\}$$

for the first image in front of the encoding pyramid feature $$\{P_1^b, P_2^b, P_3^b, P_4^b\}$$

for the second image, inputting the stitched encoding pyramid feature to the homography matrix estimation transformer network 326, and performing prediction.

Likewise, when local homography matrices for the second image with respect to the first image are predicted, the image processing method may predict the local homography matrices of the second image with respect to the first image by stitching the encoding pyramid feature for the second image in front of the encoding pyramid feature for the first image and then inputting the stitched encoding pyramid feature to the homography matrix estimation transformer network 326.

Specifically, as shown in FIG. 4, the image processing method may generate homography matrices $$\{H_{ba}^1, H_{ba}^2, H_{ba}^3, H_{ba}^4\}$$

of the second image with respect to the first image by stitching the encoding pyramid feature $$\{P_1^b, P_2^b, P_3^b, P_4^b\}$$

for the second image in front of the encoding pyramid feature $$\{P_1^a, P_2^a, P_3^a, P_4^a\}$$

for the first image, inputting the stitched encoding pyramid feature to the homography matrix estimation transformer network 326, and performing prediction.

The image processing method may generate the local homography matrices of the first image with respect to the second image through operations 710 and 720 of FIG. 7. The homography matrix estimation module 320 may predict different local homography matrices for different segmentation masks based on the matched segmentation mask pairs obtained by the unsupervised coarse segmentation module 310. That is, the local homography matrices that are accurate for multiple planes may be predicted, which may consider the plane parallax problem more explicitly. Similar remarks apply to the second image.

Figure 5C:
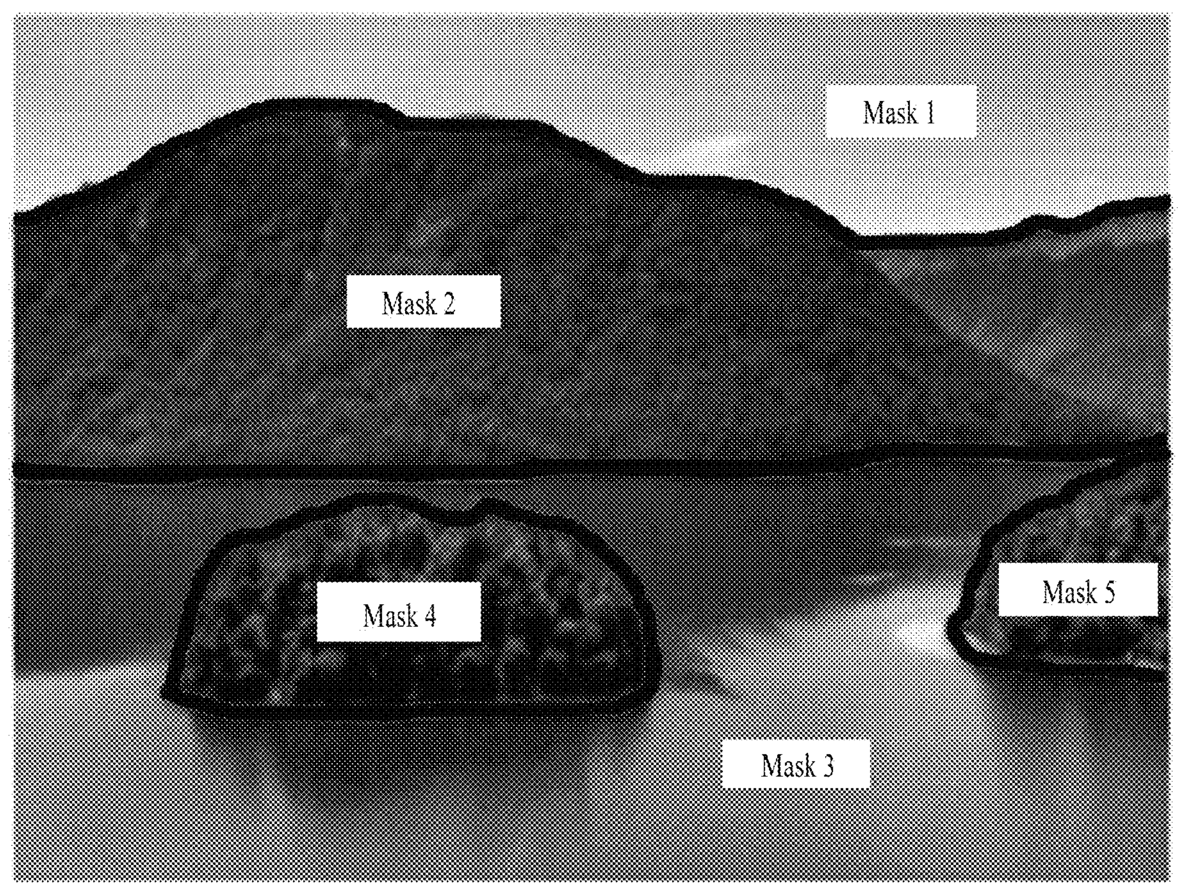
FIG. 5C illustrates an example segmentation mask, according to one or more embodiments.

FIG. 5C illustrates an example segmentation mask, according to one or more embodiments.

Referring to FIG. 5C, different segmentation masks and homography matrices in different regions may need to be processed to accurately align the sky (mask 1), mountain (mask 2), water (mask 3), and small islands (mask 4 and mask 5), respectively.

Figure 5D:
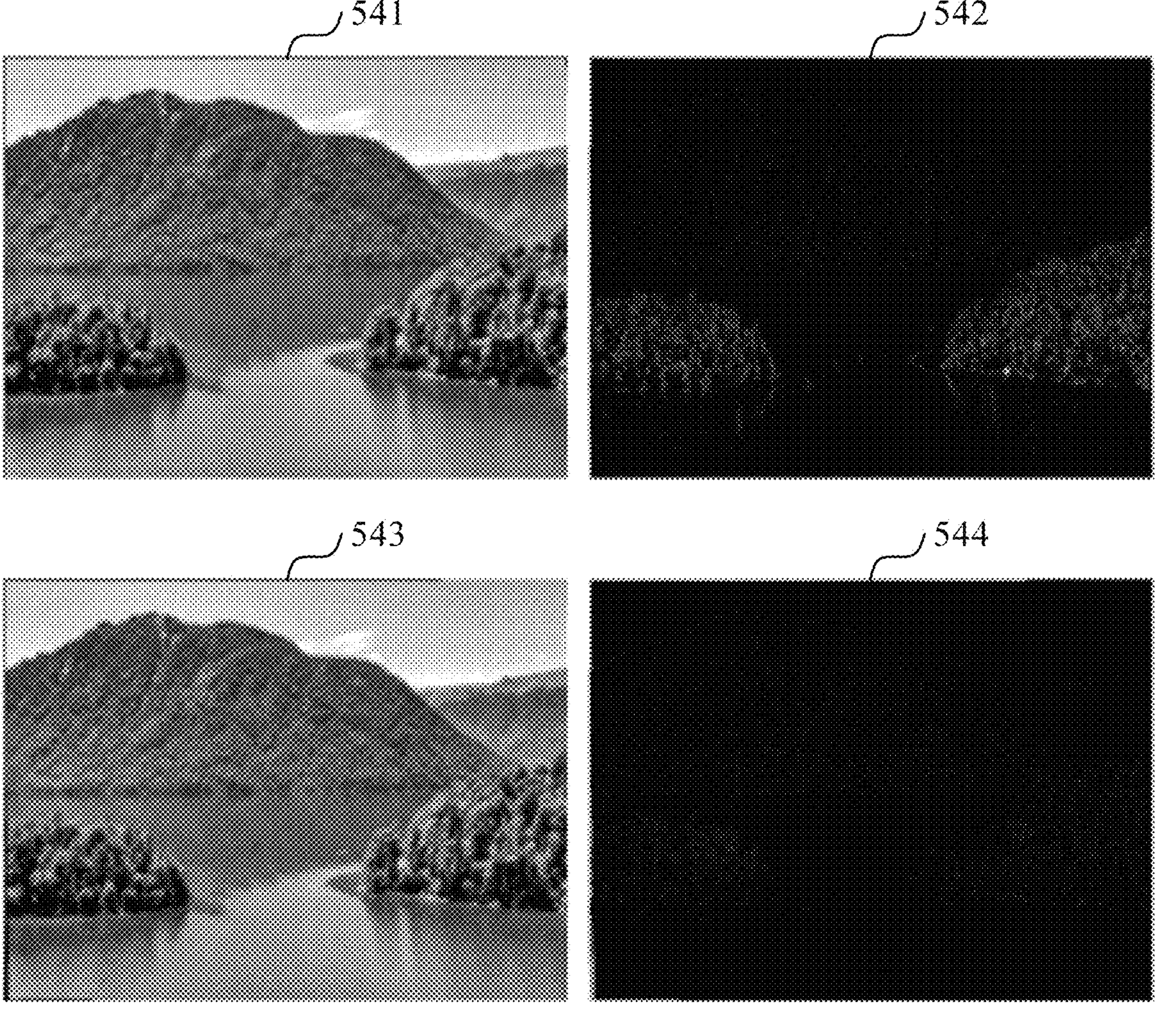
FIG. 5D illustrates an example of comparing (i) a result obtained by distorting an image by a set of local homography matrices predicted by a multi-homography estimation module with (ii) a result obtained by distorting an image by a global homography matrix obtained with an existing technique, according to one or more embodiments.

FIG. 5D illustrates an example of comparing a result obtained by distorting an image by local homography matrices predicted by a multi-homography estimation module with a result obtained by distorting an image by a global homography matrix of the existing technique, according to one or more embodiments.

As shown in FIG. 5D, images 541 and 542 represent an image after distortion of a target image and the difference between the distorted image and the target image, respectively, according to the method of a previous technique. In contrast, images 543 and 544 represent an image after distortion of the target image and the difference between the distorted image and the target image, respectively, according to an implementation according to the present disclosure. As shown in FIG. 5D, the result obtained according to the method of the previous technique may align the mountain and sky but not the two small islands in front of the mountain and sky. On the other hand, the result obtained according to the present disclosure has a better alignment result on the entire image. The method of the present disclosure may estimate a local homography matrix corresponding to each masked region, so the method of the present disclosure is more accurate locally. On the other hand, the method of the previous technique may estimate a global homography matrix for the entire image, and the global homography matrix may not be locally accurate enough because the global homography matrix tries to focus on the main plane.

Referring back to FIG. 2, in operation 230, the image processing method may generate a resulting image obtained by aligning the first image with the second image, based on the local homography matrices, the segmentation mask pairs, the first image, and the second image. Operation 230 may be performed by the residual feature fusion module 330 of FIG. 3.

When a segmentation mask region corresponding to each of segmentation masks included in an image pair is aligned using the local homography matrices (as per the nature of homography matrices), some misalignment may occur near the mask boundary due to homography matrix estimation error and/or segmentation error. The present disclosure may generate the final fused image (i.e., a resulting image obtained by aligning the first image with the second image) from distorted first images using the residual feature fusion module 330. Since the final fused image achieves more accurate alignment with the second image $I^b$ and looks more natural without artifacts, the residual feature fusion module 330 may need to maintain the distortion as consistent as possible in the segmentation mask and perform reasonable fusion on the mask boundary.

Assuming that $\mathcal{F}us$ denotes an image fusion weight matrix obtaining module of the residual feature fusion module 330 and F denotes the final fusion result, a process of generating a fused image for the first image may be as expressed by Equation 3 and Equation 4 below.

$$\mathcal{W}_{fus}^a = \{W_{fus_i}^a\}_{i=1}^{num^H} = \mathcal{F}us(I^a, I^b; \mathcal{M}^a, \mathcal{M}^b; \mathcal{H}_{local}^{ab}) \quad \text{Equation 3}$$

$$F^a = \sum\left(\mathcal{W}_{fus}^a \times \mathcal{W}arp_{\mathcal{H}_{local}^{ab}}^{I^a}\right) \quad \text{Equation 4}$$

Here, $$\mathcal{W}^a_{fus}$$

denotes one image fusion weight matrix of a first image and $$\mathcal{W}^a_{fus}$$

denotes a set of image fusion weight matrices (i.e., image fusion weight matrices) of the first image. Assuming that $$Warp^I_H$$

denotes a distorted image obtained by distorting an image I using a homography matrix H, $$\mathcal{W}arp^{I^a}_{\mathcal{H}^{ab}_{local}}$$

denotes a set of distorted images obtained by distorting the first image $I^a$ using each local homography matrix $$H^{ab}_{local}$$

of a set of local homography matrices $$\mathcal{H}^{ab}_{local}$$

(i.e., local homography matrices).

A process in which the residual feature fusion module 330 generates the local homography matrices of the first image with respect to the second image is described in detail with reference to FIG. 8.

Figure 8:
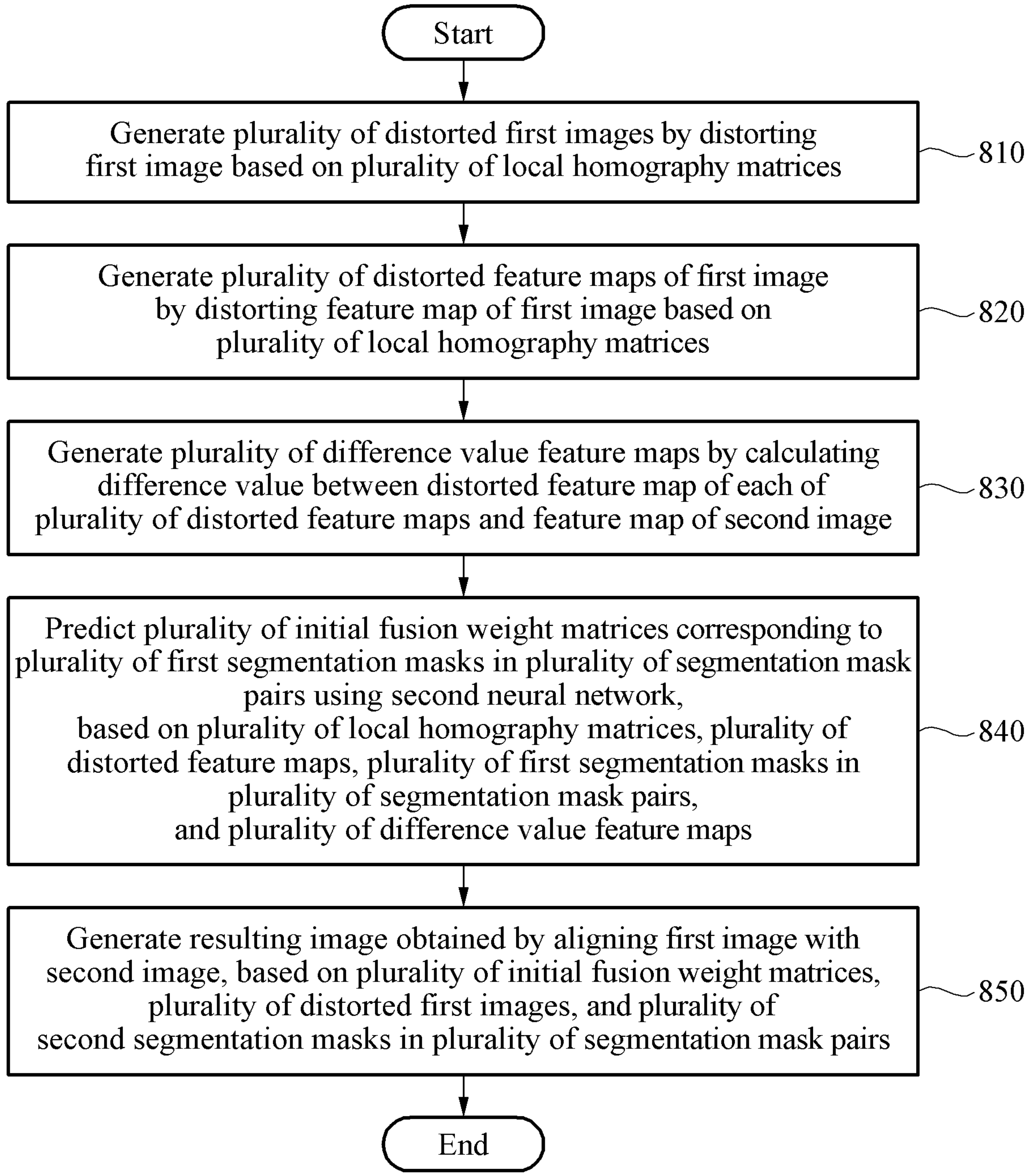
FIG. 8 illustrates an example of obtaining a result image by aligning a first image with a second image, the aligning based on a local homography matrices, a segmentation mask pairs, the first image, and the second image, according to one or more embodiments.

FIG. 8 illustrates an example of obtaining a resulting image obtained by aligning a first image with a second image, based on local homography matrices, segmentation mask pairs, the first image, and the second image, according to one or more embodiments.

In operation 810, the image processing method may generate distorted first images by distorting the first image based on the local homography matrices.

Specifically, as shown in FIG. 3, the image processing method may generate N distorted first images by inputting, to the residual feature fusion module 330, N local homography matrices of the first image with respect to the second image (outputted from the first image and the homography matrix estimation module 320) and distorting the first image using each local homography matrix by the residual feature fusion module 330. As shown in FIG. 4, the image processing method may generate distorted images a by distorting the first image a using each homography matrix among homography matrices $$\{H^1_{ab}, H^2_{ab}, H^3_{ab}, H^4_{ab}\}.$$

In operation 820, the image processing method may generate distorted feature maps of the first image by distorting a feature map of the first image based on the local homography matrices.

Specifically, as shown in FIG. 3, N distorted feature maps of the first image may be generated by inputting the feature map of the first image obtained by the feature extractor 322 of the homography matrix estimation module 320 to the residual feature fusion module 330 and distorting the feature map of the first image using each local homography matrix of the N local homography matrices of the residual feature fusion module 330. As shown in FIG. 4, distorted feature maps $$\{Fea^a_{warp1}, Fea^a_{warp2}, Fea^a_{warp3}, Fea^a_{warp4}\}$$

may be generated by distorting the feature map of the first image a using each homography matrix among the homography matrices $$\{H^1_{ab}, H^2_{ab}, H^3_{ab}, H^4_{ab}\}$$

of the first image a with respect to the second image.

In operation 830, the image processing method may generate difference value feature maps by calculating a difference value between a distorted feature map of each of the distorted feature maps and a feature map of the second image.

Specifically, as shown in FIG. 3, the residual feature fusion module 330 may generate N difference value feature maps by calculating a difference value feature map between each distorted feature map among the N distorted feature maps of the first image and the feature map of the second image. As shown in FIG. 4, the image processing method may generate difference value feature maps $$\{Diff^a_1, Diff^a_2, Diff^a_3, Diff^a_4\}$$

by calculating a difference value between each distorted feature map among the distorted feature maps $$\{Fea^a_{warp1}, Fea^a_{warp2}, Fea^a_{warp3}, Fea^a_{warp4}\}$$

of the first image a and the feature map of the second image.

In operation 840, the image processing method may predict initial fusion weight matrices corresponding to first segmentation masks in the segmentation mask pairs using the second neural network, and may do so based on the local homography matrices, the distorted feature maps, the first segmentation masks in the segmentation mask pairs, and the difference value feature maps.

The second neural network may include, for example, a predictor 332 shown in FIG. 3, and the predictor 332 may be based on a CNN, RNN, etc. However, the present disclosure is not limited thereto.

Specifically, as shown in FIG. 3, the image processing method may predict initial fusion weight matrices by inputting the local homography matrices, distorted feature maps, first segmentation masks of segmentation mask pairs, and difference value feature maps to the predictor 332. For example, as shown in FIG. 4, initial fusion weight matrices may be predicted by inputting local homography matrices $$\{H_{ab}^1, H_{ab}^2, H_{ab}^3, H_{ab}^4\},$$

the distorted feature maps $$\{Fea_{warp1}^a, Fea_{warp2}^a, Fea_{warp3}^a, Fea_{warp4}^a\}$$

of the first image a, the difference value feature maps $$\{Diff_1^a, Diff_2^a, Diff_3^a, Diff_4^a\},$$

and first segmentation masks $$\{M_1^a, M_2^a, M_3^a, M_4^a\}$$

corresponding to the first image a to the predictor 332.

In operation 850, the image processing method may generate a resulting image obtained by aligning the first image with the second image, based on the initial fusion weight matrices, the distorted first images, and second segmentation masks in the segmentation mask pairs. This is described next with reference to FIGS. 4, 9, and 10.

Figure 9:
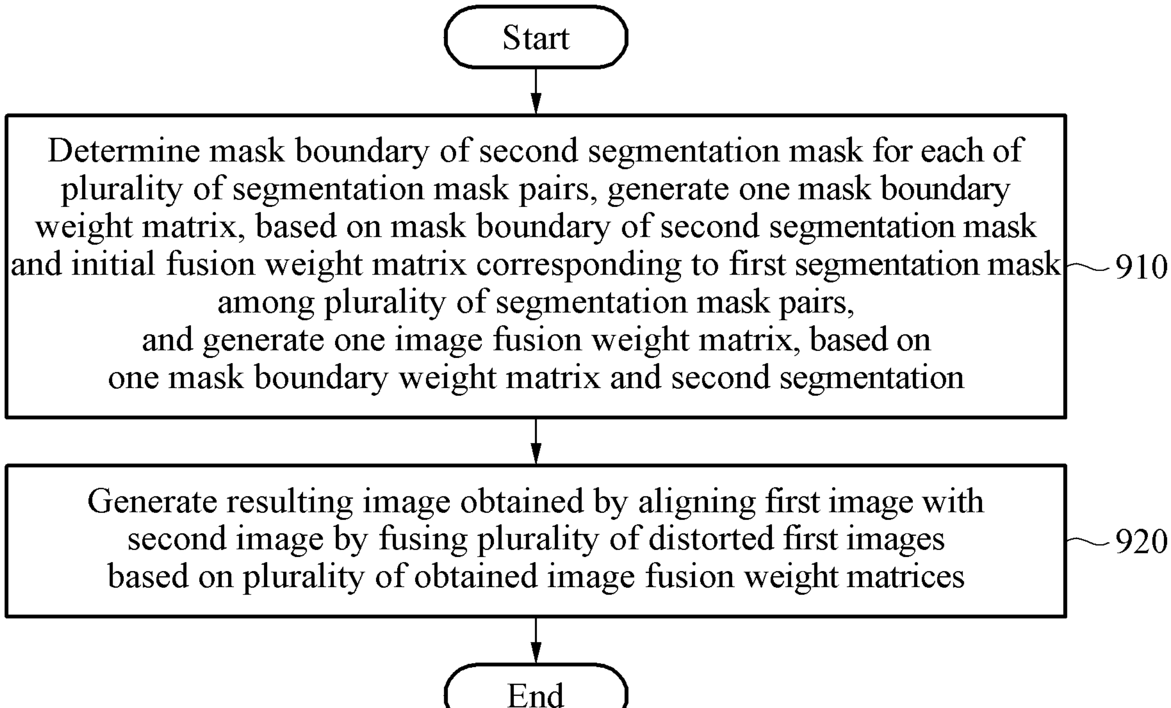
FIG. 9 illustrates an example of obtaining a result image by aligning a first image with a second image, the aligning based on a set of initial fusion weight matrices, distorted first images, and second segmentation masks associated with the second image in segmentation mask pairs, according to one or more embodiments.

FIG. 9 illustrates an example of obtaining a resulting image obtained by aligning a first image with a second image, based on initial fusion weight matrices, distorted first images, and second segmentation masks associated with the second image in segmentation mask pairs.

In operation 910, the image processing method may (i) determine a mask boundary of a second segmentation mask for each of the segmentation mask pairs, (ii) generate one mask boundary weight matrix based on the mask boundary of the second segmentation mask and based on an initial fusion weight matrix corresponding to a first segmentation mask among the segmentation mask pairs, and (iii) generate one image fusion weight matrix based on the one mask boundary weight matrix and the second segmentation mask.

Figure 10:
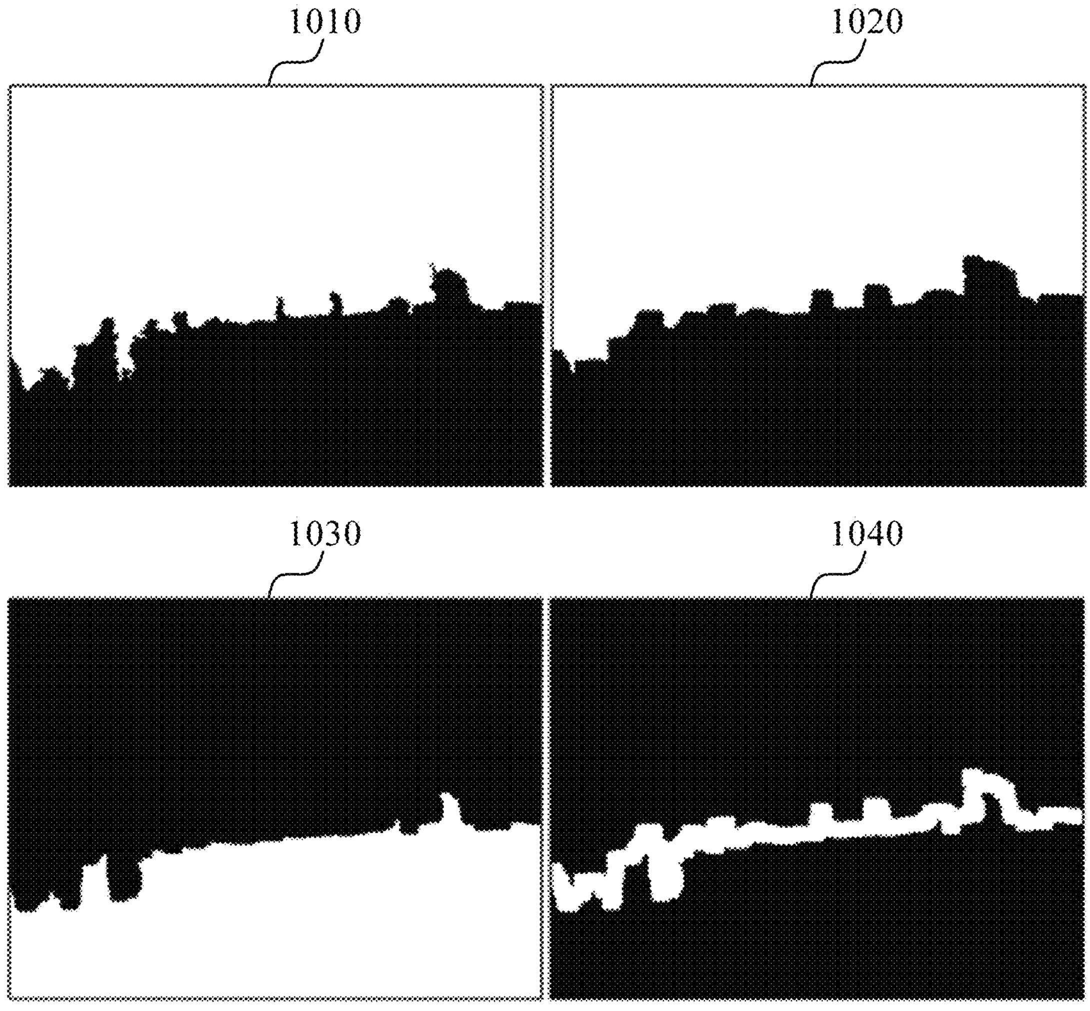
FIG. 10 illustrates an example of determining a mask boundary of a segmentation mask, according to one or more embodiments.

FIG. 10 illustrates an example of determining a mask boundary of a segmentation mask, according to one or more embodiments.

Referring to FIG. 10, an image 1010 of FIG. 10 represents a second segmentation mask $M^b$. First, an erosion result of the second segmentation mask $M^b$ shown in an image 1020 of FIG. 10 may be generated by performing an erosion operation on the second segmentation mask $M^b$. The image processing method may then generate an erosion result of $1-M^b$ shown in an image 1030 of FIG. 10 by performing an erosion operation on $1-M^b$. Finally, the image processing method may generate a mask boundary shown in an image 1040 of FIG. 10 by multiplying the erosion result of $1-M^b$ by the erosion result of the second segmentation mask $M^b$. A process of determining a mask boundary of a second segmentation mask in the above-described segmentation mask pairs may be performed as expressed by Equation 5.

$$M_{boundary}^b = (1-\varepsilon(M^b)) \times (1-\varepsilon(1-M^b)) \quad \text{Equation 5}$$

Here, ε denotes an erosion operation and $$M_{boundary}^b$$

denotes a mask boundary of the second segmentation mask $M^b$.

The image processing method may then generate one mask boundary weight matrix, and may do so based on the mask boundary of the second segmentation mask and an initial fusion weight matrix corresponding to the first segmentation mask of the segmentation mask pairs. For example, the image processing method may generate one mask boundary weight matrix by multiplying the mask boundary of the second segmentation mask by the initial fusion weight matrix corresponding to the first segmentation mask of the segmentation mask pairs.

The image processing method may then generate one image fusion weight matrix, based on the one mask boundary weight matrix and the second segmentation mask.

Specifically, the image processing method may generate one weight matrix by adding a mask boundary weight to the second segmentation mask and then generate one image fusion weight matrix by normalizing the one weight matrix.

A process of generating the image fusion weight matrix may be performed as expressed by Equation 6 below.

$$W_{fus}^a = \frac{W_{fus\_init}^a \times M_{boundary}^b + M^b}{\sum_1^N (W_{fus\_init}^a \times M_{boundary}^b + M^b)} \quad \text{Equation 6}$$

Here, $$W_{fus}^a$$

denotes an image fusion weight matrix of the first image a and $$W_{fus\_init}^a$$

denotes an initial fusion weight matrix corresponding to a first segmentation mask $M^a$ of the second segmentation mask $M^b$. The $$W_{fus\_init}^a$$

may be predicted by the predictor 332; the prediction process is described above. A process as described by Equation 6 may help maintain consistent distortion in a mask.

The image processing method may generate image fusion weight matrices for the segmentation mask pairs through operation 910.

As shown in FIG. 4, the image processing method may generate image fusion weight matrices $$\{W_1^a, W_2^a, W_3^a, W_4^a\}$$

using Equation 5 and Equation 6, and may do so based on initial fusion weight matrices $$W^a_{fus\_init}$$

(not shown) predicted by the predictor 332 and a second image segmentation masks $$\{M_1^b, M_2^b, M_3^b, M_4^b\}$$

associated with the second image among the segmentation mask pairs. Here, each of the image fusion weight matrices $$\{W_1^a, W_2^a, W_3^a, W_4^a\}$$

may be generated by calculation as described by Equation 6.

In operation 920, the image processing method may generate a resulting (output/final/synthetic) image obtained by aligning the first image with the second image by fusing the distorted first images based on the obtained image fusion weight matrices.

Specifically, the image processing method may align the first image with the second image by obtaining a first image to which weights is assigned by assigning the weights to the distorted first images corresponding to each of the image fusion weight matrices and then obtaining a fused image for the first image by adding pixels corresponding to the first image to which the weights is assigned. As shown in FIG. 4, the image processing method may generate a resulting image obtained by aligning the first image with the second image by assigning and adding weights to the distorted images a using the image fusion weight matrices $$\{W_1^a, W_2^a, W_3^a, W_4^a\}.$$

In addition, mostly the process of aligning the first image with the second image is described with reference FIG. 4. The part below the dashed line of FIG. 4 shows a process of aligning the second image with the first image, and the process is similar to the process of aligning the first image with the second image.

Hereinafter, to aid understanding, another description of the overall process of aligning the first image with the second image is described with reference to FIG. 11.

Figure 11:
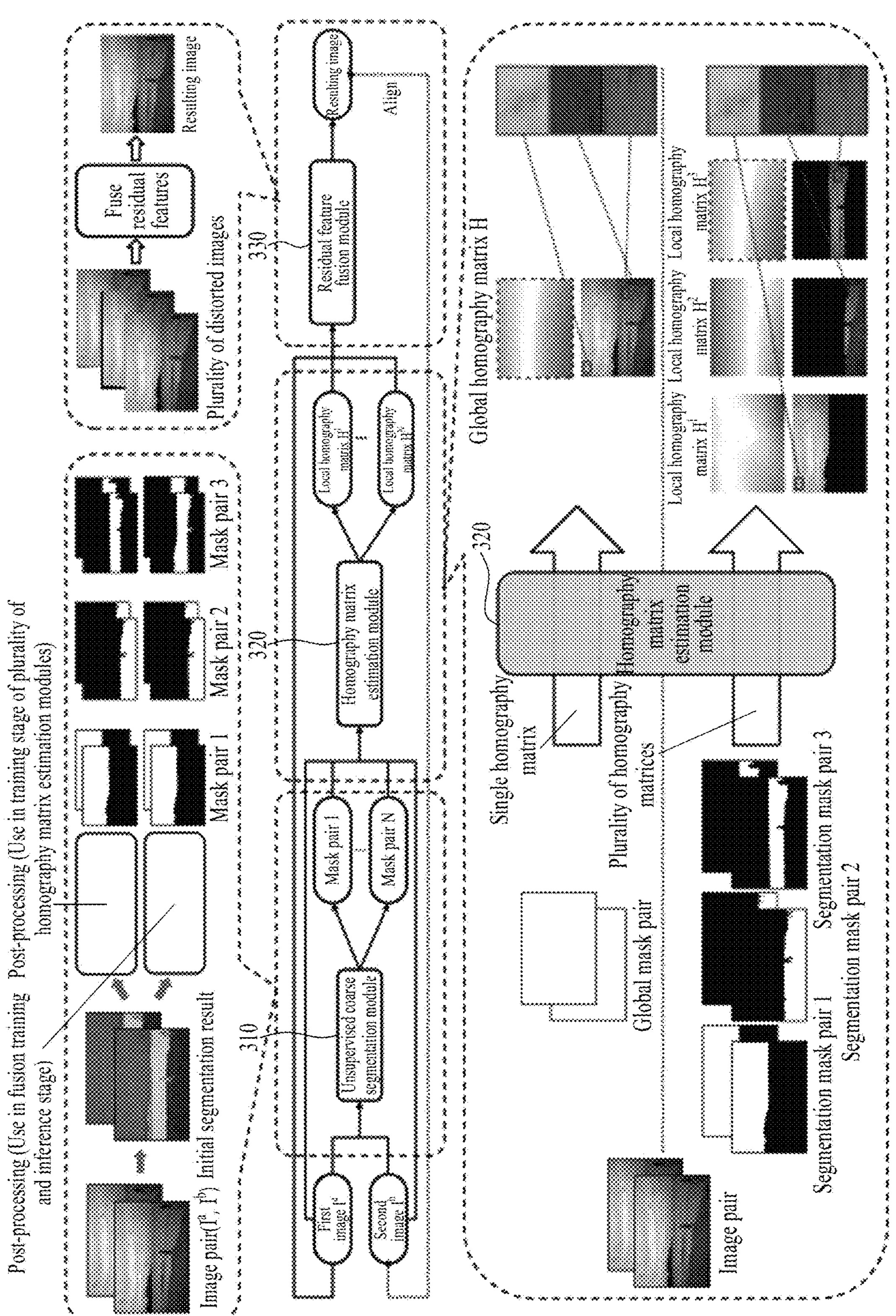
FIG. 11 illustrates an example of aligning a first image with a second image using an image processing method, according to one or more embodiments.

FIG. 11 illustrates an example of aligning a first image with a second image using the image processing method, according to one or more embodiments.

Referring to FIG. 11, the first image $I^a$ and the second image $I^b$ may be input to the unsupervised coarse segmentation module 310. As shown in the upper left part of FIG. 11, the unsupervised coarse segmentation module 310 may first generate an initial segmentation result of the first image $I^a$ and an initial segmentation result of the second image $I^b$ by initially segmenting the first image $I^a$ and the second image $I^b$, respectively. The unsupervised coarse segmentation module 310 may then generate N segmentation mask pairs (e.g., mask pair 1, mask pair 2, and mask pair 3) by performing post-processing suitable for fusion training and inference stage on the initial segmentation result of the first image $I^a$ and the segmentation result of the second image $I^b$.

Then, the obtained N segmentation mask pairs, the first image $I^a$, and the second image $I^b$ may be input to the homography matrix estimation module 320.

As shown in the lower part of FIG. 11, the homography matrix estimation module 320 may predict N local homography matrices of the first image $I^a$ with respect to the second image $I^b$, based on the first image $I^a$, the second image $I^b$, and the N segmentation mask pairs. Furthermore, as described above with reference to FIG. 6, in the homography matrix estimation module 320, for mismatched segmentation masks, a global homography matrix H may be predicted based on the first image $I^a$, the second image $I^b$, and a global mask pair. The global homography matrix H may be used to distort the first image $I^a$ with respect to the mismatched segmentation masks.

Then, the obtained local homography matrices, the first image $I^a$, and the second image $I^b$ may be input to the residual feature fusion module 330, and when the homography matrix estimation module 320 generates the global homography matrix H, the global homography matrix H may be simultaneously input to the residual feature fusion module 330. The residual feature fusion module 330 may distort the first image $I^a$ based on the local homography matrices, and furthermore, when the global homography matrix H is received from the homography matrix estimation module 320, distorted first images may be finally generated by distorting the first image $I^a$ based on the global homography matrix H. Then, a resulting image may be obtained by aligning the first image $I^a$ (which is a fusion result obtained by fusing the distorted first images obtained based on image fusion weight matrices obtained by the residual feature fusion module 330) with the second image $I^b$.

In addition, the upper left of FIG. 11 shows a process of post-processing the initial segmentation result performed in the training stage of the unsupervised coarse segmentation module 310 for the homography matrix estimation module 320 (i.e., the first neural network); the post-processing process is described in detail below.

The first neural network and the second neural network described herein are networks and/or models trained using training data, and the process of training the first neural network and the second neural network is described in detail below.

Figure 12:
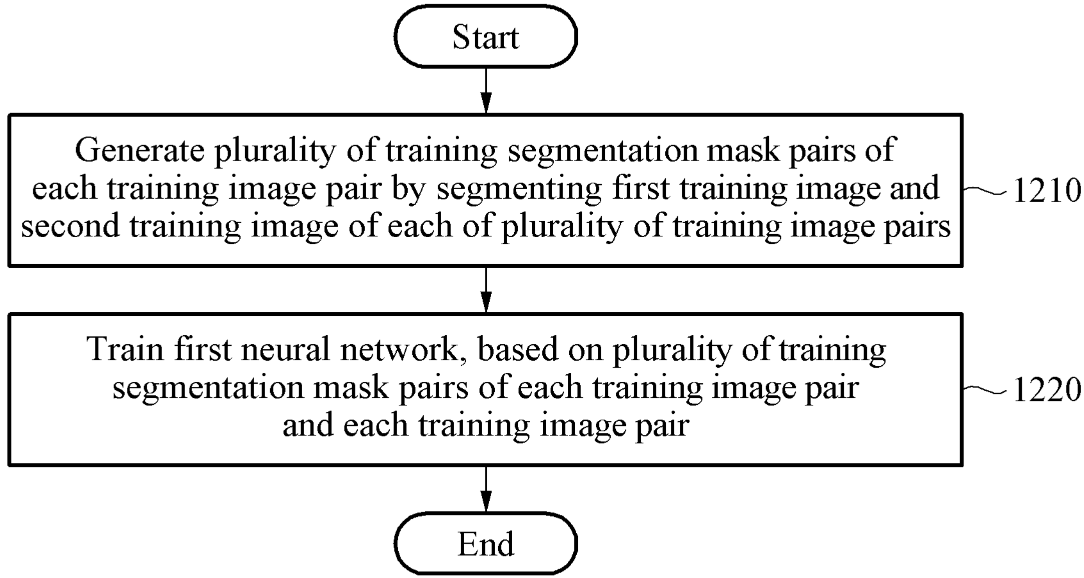
FIG. 12 illustrates an example of training a first neural network, according to one or more embodiments.

FIG. 12 illustrates an example of training the first neural network, according to one or more embodiments.

As shown in FIG. 12, in operation 1210, the unsupervised coarse segmentation module 310 may generate training segmentation mask pairs of each training image pair by segmenting a first training image and a second training image thereof.

Specifically, similar to the description of operation 210 of FIG. 2, the unsupervised coarse segmentation module 310 may generate, for a given/representative pair of first and second training images, initial segmentation masks of the first training image and initial segmentation masks of the second training image by initially segmenting the first training image and the second training image. As described with reference to FIG. 3, the first training image and the second training image may be initially segmented by the unsupervised coarse segmentation module 310 using any unsupervised segmentation method, and through this, the initial segmentation masks of the first training image and the initial segmentation masks of the second training image may be generated.

The unsupervised coarse segmentation module 310 may then generate training segmentation mask pairs of one training image pair by post-processing the initial segmentation masks of the first training image and the initial segmentation masks of the second training image. Hereinafter, this is described with reference to FIG. 5A and the left part of FIG. 6 (i.e., operations 610 and operations 650 to 670).

As shown in FIG. 6, in operation 610, the image processing method may determine first training segmentation masks based on the initial segmentation masks of the first training image and may determine second training segmentation masks based on the initial segmentation masks of the second training image. Here, each of the first training segmentation masks of the first training image and the second training segmentation masks of the second training image may be a training segmentation mask of a connected region. With the exception of the fact that operation 610 is performed on training images, operation 610 is otherwise as described above.

Specifically, in operation 610, when a first segmentation fragment, which is an initial segmentation mask having an area less than the second threshold value, exists among the initial segmentation masks of the first training image, the image processing method may (i) fill, among the initial segmentation masks of the first training image, the first segmentation fragment using (i.e., joining the fragment into) a mask adjacent to the first segmentation fragment and may (ii) determine each connected region of the initial segmentation masks of the first training image to be a first training segmentation mask after performing the filling. In addition, in operation 610, the image processing method may determine each connected region of the initial segmentation masks of the first training image to be a first training segmentation mask when the first segmentation fragment does not exist (when there are no more fragments). Here, the first threshold value may be greater than the second threshold value. In addition, in operation 610, when the second segmentation fragment, which is an initial segmentation mask having an area less than the second threshold value, exists among the initial segmentation masks of the second training image, the image processing method may (i) fill, among the initial segmentation masks of the second training image, the second segmentation fragment using (i.e., joining the fragment into) a mask adjacent to the second segmentation fragment and may (ii) determine each connected region of the initial segmentation masks of the second training image to be a second training segmentation mask. Additionally, in operation 610, the image processing method may determine each communication region of the initial segmentation masks of the second training image to be a second training segmentation mask when the second segmentation fragment does not exist (when there are no more fragments). Operation 610 is described above with reference to FIG. 6.

In operation 650, the image processing method may select all first training segmentation masks having areas greater than the first threshold value from among the first training segmentation masks and may select all second training segmentation masks having areas greater than the first threshold value from among the second training segmentation masks.

Specifically, after operation 610, in operation 650, the image processing method may order first training segmentation masks by area and then select all first training segmentation masks having areas greater than the first threshold value. Further in operation 650, the image processing method may select all second training segmentation masks having areas greater than the first threshold value from among the aligned second training segmentation masks (the first threshold value may be the same as the in operation 620). As shown in FIG. 5A, all training segmentation masks having areas greater than the first threshold value, that is, the segmentation mask of the sky, segmentation mask of the sea, and segmentation mask of the beach, may be selected from row 1, column 3 and row 2, column 3 but the segmentation mask of the mountain and segmentation mask of the human may not be selected, and through this, the result in row 1, column 4 and the result in row 2, column 4 may be generated.

In operation 660, the image processing method may remove a segmentation mask of a predetermined category from all selected first and second training segmentation training masks. Specifically, as described above, when the first training image and the second training image are each initially segmented, a category may be generated for each initial training segmentation mask, for example mountain, sea, traffic, animal, human, and operation. Here, any segmentation mask including a category of an operation target (e.g., the traffic, animal, human, and operation) may be removed from all selected first training segmentation masks and all selected second training segmentation masks.

In operation 670, the image processing method may generate training segmentation mask pairs by performing mask matching on the remaining first and second training segmentation masks. A mask matching reference in operation 670 is the same as the mask matching reference described above in operation 640. In addition, the final output of the post-processing process including operations 610, 650 to 670 may be an image pair $$\left(I^a, I^b; \left(M^a_{index}, M^b_{index}\right)_i^{\#I}\right)$$

that actually includes all matched segmentation mask pairs in an image pair. In FIG. 6, I denotes the total number of matched segmentation masks, $$M^a_{index}$$

denotes a segmentation mask indexed by the index of the first image $I^a$, and $$M^b_{index}$$

denotes a segmentation mask indexed by the index of the second image $I^b$.

The training segmentation mask pairs required for training the first neural network may be generated.

Referring back to FIG. 12, in operation 1220, the image processing method may train the first neural network, based on the training segmentation mask pairs of each training image pair.

Assuming that the first training image and the second training image of a current training image pair are $(I^a, I^b)$, the first neural network may be trained using a loss function expressed as Equation 7 below.

$$\text{Loss}_H = \text{Loss}_{tri\_f} + \text{Loss}_{tri\_b} + \text{Loss}_{FIL} \quad \text{Equation 7}$$

Here, $\text{Loss}_{tri\_f}$ and $\text{Loss}_{tri\_b}$ denote a mask forward triplet loss function when distorting from the first training image $I^a$ to a second training image $I^b$ and a mask reverse triplet loss function when distorting from the second training image $I^b$ to the first training image $I^a$, respectively, and $\text{Loss}_{FIL}$ denotes a mask feature identity loss function. Here, the mask forward triplet loss function $\text{Loss}_{tri\_f}$ when distorting from the first training image $I^a$ to the second training image $I^b$ may maintain the difference between two mask regions while moving a mask region of the first training image $I^a$ close to a mask region corresponding to the second training image $I^b$. Similarly, the mask reverse triplet loss function $\text{Loss}_{tri\_b}$ when distorting from the second training image $I^b$ to the first training image $I^a$ may maintain the difference between two regions while moving a mask region of the second training image $I^b$ close to a mask region corresponding to the first training image $I^a$. The mask feature identity loss function $\text{Loss}_{FIL}$ may make the feature extractor 322 to be warp equivalent. Assuming that the current training image pair including the first training image $I_a$ and the second training image $I^b$ is $(I^a, I^b)$, one training segmentation mask pair may be $(M^a, M^b)$ and a local homography matrix of the first training image $I^a$ with respect to the second training image $I^b$ corresponding to the one training segmentation mask $(M^a, M^b)$ may be $$H^{ab}_{local}.$$

In this case, the mask feature identity loss function $\text{Loss}_{FIL}$ may be expressed as Equation 8 below.

$$\text{Loss}_{FIL} = \left\| M^b \times Warp^{\mathcal{F}_{ea}(I^a)}_{H^{ab}_{local}} - M^b \times \mathcal{F}_{ea}\left(Warp^{I^a}_{H^{ab}_{local}}\right) \right\| + \left\| M^a \times Warp^{\mathcal{F}_{ea}(I^b)}_{H^{ba}_{local}} - M^a \times \mathcal{F}_{ea}\left(Warp^{I^b}_{H^{ba}_{local}}\right) \right\| \quad \text{Equation 8}$$

Here, $\mathcal{F}_{ea}$ denotes the feature extractor 322, $\mathcal{F}_{ea}(I^a)$ denotes a feature map of the first training image $I^a$ proposed by the feature extractor 322, and $$Warp^{\mathcal{F}_{ea}(I^a)}_{H^{ab}_{local}}$$

enotes a distorted feature map obtained by distorting the feature map $\mathcal{F}_{ea}(I^a)$ of the first training image $I^a$ using the homography matrix $$H^{ab}_{local}.$$

When distorting from the first training image $I^a$ to the second training image $I_b$, the correlation amount (Anchor, Positive, and Negative) of the mask forward triplet loss function $\text{Loss}_{tri\_f}$ may be expressed as Equation 9 below.

$$\text{Anchor: } M^b \times \mathcal{F}_{ea}(I^b),\ \text{Positive: } M^b \times Warp^{\mathcal{F}_{ea}(I^a)}_{H^{ab}_{local}},\ \text{Negative: } M^a \times \mathcal{F}_{ea}(I^a) \quad \text{Equation 9}$$

When distorting from the second training image $I^b$ to the first training image $I^a$, the correlation amount (Anchor, Positive, and Negative) of the mask reverse triplet loss function $\text{Loss}_{tri\_b}$ may be expressed as Equation 10 below.

$$\text{Anchor: } M^a \times \mathcal{F}_{ea}(I^a),\ \text{Positive: } M^a \times Warp^{\mathcal{F}_{ea}(I^b)}_{H^{ab}_{local}},\ \text{Negative: } M \times \mathcal{F}_{ea}(I^b) \quad \text{Equation 10}$$

The training of the first neural network may be completed using Equation 7 based on the training segmentation mask pairs of each training image pair and each training image pair.

Figure 13:
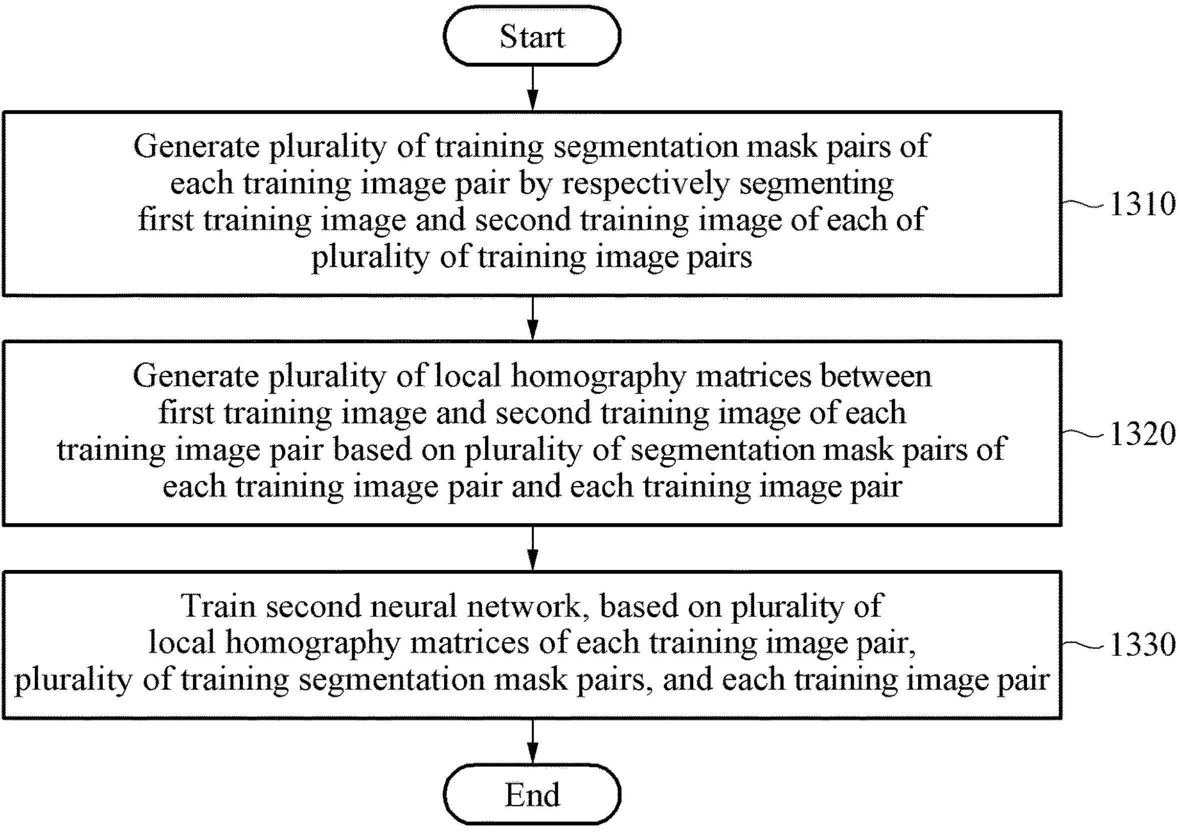
FIG. 13 illustrates an example of training a second neural network, according to one or more embodiments.

FIG. 13 illustrates an example of a process of training a second neural network, according to one or more embodiments.

Referring to FIG. 13, in operation 1310, the image processing method may generate training segmentation mask pairs of each training image pair by respectively segmenting a first training image and a second training image of each of training image pairs. Here, each training segmentation mask pair may include a segmentation mask for one region of the first training image and a segmentation mask of a region corresponding to the one region of the first training image in the second training image.

Specifically, similar to the description in operation 210 of FIG. 2, the image processing method may first segment the first training image of one first training image and the second training image, respectively, and may generate initial segmentation masks of the first training image and initial segmentation masks of the second training image.

The image processing method may then generate a training segmentation mask pairs of one training image pair by post-processing the initial segmentation masks of the first training image and the initial segmentation masks of the second training image.

Specifically, the image processing method may determine first training segmentation masks of the first training image according to the initial segmentation masks of the first training image and may determine second training segmentation masks of the second training image according to the initial segmentation masks of the second training image. Here, each of the first training segmentation masks and the second training segmentation masks may be a training segmentation mask distinguished by a connected region. The image processing method may then select M first training segmentation masks from the first training segmentation masks and may select M second training segmentation masks from the second training segmentation masks. Here, each of the selected M first training segmentation masks and the selected M second training segmentation masks may have an area greater than the first threshold value, and M may be an integer greater than 1. The image processing method may then merge an unselected first training segmentation mask into one of the M first training segmentation masks and may merge an unselected second training segmentation mask into one of the M second training segmentation masks. Finally, the image processing method may generate the training segmentation mask pairs of one training image by performing mask matching on the M first training segmentation masks and the M second training segmentation masks.

When first segmentation masks of the first training image are determined according to the initial segmentation masks of the first training image and when second segmentation masks of the second training image are determined according to the initial segmentation masks of the second training image, the image processing method, when a first segmentation fragment (which is an initial segmentation mask having an area less than the second threshold value) exists among the initial segmentation masks of the first training image, may fill, among the initial segmentation masks of the first training image, the first segmentation fragment using a mask adjacent to (e.g., joining the fragment into) the first segmentation fragment and may determine each connected region of the initial segmentation masks of the first training image to be a first training segmentation mask after performing the filling, and when the first segmentation fragment does not exist (i.e., there are no more fragments), the image processing method may determine each communication region of the initial segmentation masks of the first training image to be a first training segmentation mask. Here, the first threshold value may be greater than the second threshold value. In addition, when a second segmentation fragment, which is an initial segmentation mask having an area less than the second threshold value, exists among the initial segmentation masks of the second training image, the image processing method may fill, among the initial segmentation masks of the second training image, the second segmentation fragment using a mask adjacent to (e.g., joining the fragment into) the second segmentation fragment and may determine each connected region of the initial segmentation masks of the second training image to be a second training segmentation mask after performing the filling, and when the second segmentation fragment does not exist, the image processing method may determine each communication region of the initial segmentation masks of the second training image to be a second training segmentation mask. The process of generating an initial segmentation mask for a training image is the same as the process described above in operation 610 and operations 620 to 640 shown on the right side of FIG. 6.

In operation 1320, the image processing method may generate local homography matrices between the first training image and the second training image of each training image pair based on segmentation mask pairs of each training image pair and each training image pair.

Specifically, the image processing method may generate local homography matrices of the first training image with respect to the second training image and local homography matrices of the second training image with respect to the first training image of each training image pair using the first neural network, based on the segmentation mask pairs of each training image pair and each training image pair. This is similar to the process of generating the local homography matrices of the first image with respect to the second image based on the segmentation mask pairs described above with reference to FIG. 7. The image processing method, for each training image pair, may generate the local homography matrices of the first training image thereof with respect to the second training image using the first neural network, based on segmentation mask pairs of the training image pair and based on the training image pair (the images). In addition, the image processing method may generate the local homography matrices of the second training image with respect to the first training image using the first neural network, based on the segmentation mask pairs of the one training image pair and the one training image. The process of generating the local homography matrices is described above in detail with reference to FIG. 7.

In operation 1330, the image processing method may train the second neural network, based on the local homography matrices of each training image pair, the training segmentation mask pairs, and each training image pair.

Assuming that the first training image and the second training image of a current training image pair are $(I^a, I^b)$, the second neural network may be trained using a loss function expressed as Equation 11 below.

$$\text{Loss}_F = \text{Loss}'_{tri\_f} + \text{Loss}'_{tri\_b} + \lambda \times \text{Loss}_{TV} \quad \text{Equation 11}$$

Here, $\text{Loss}'_{tri\_f}$ and $\text{Loss}'_{tri\_b}$ denote a general forward triplet loss function when distorting from the first training image $I^a$ to the second training image $I^b$ and a general reverse triplet loss function when distorting from the second training image $I^b$ to the first training image $I^a$, respectively. $\text{Loss}_{TV}$ denotes the total variation loss function of an image fusion weight matrix and $\lambda$ denotes a weight of the total variation loss. Assuming that the first training image $I^a$ and the second training image $I^b$ of the current training image pair are $(I^a, I^b)$, the training segmentation mask pair may be $(M^a, M^b)$, the set of image fusion weight matrices of the first training image $I^a$ may be $$\mathcal{W}^a_{fus},$$

and a set of image fusion weight matrices of the second training image $I^b$ may be $$\mathcal{W}^b_{fus}.$$

In this case, the total variation loss function $\text{Loss}_{TV}$ of the image fusion weight matrix may be expressed as Equation 12 below.

$$\text{Loss}_{TV} = \text{Loss}_{TV}(\mathcal{W}^a_{fus}) + \text{Loss}_{TV}(\mathcal{W}^b_{fus}) \quad \text{Equation 12}$$

Since trained fusion weights may be smoothed when the total variation loss function $\text{Loss}_{TV}$ is used, a natural fusion effect may be generated at the mask boundary by correcting the potential misalignment through reasonable fusion at the mask boundary.

When distorting from the first training image $I^a$ to the second training image $I^b$, the correlation amount (Anchor; Positive, and Negative) of the general forward triplet loss function $$\text{Loss}'_{tri\_f}$$

may be expressed as Equation 13 below.

$$\text{Anchor: } \mathcal{F}_{ea}(I^b),\ \text{Positive: } \mathcal{W}^a_{fus} \times \mathcal{W}arp^{I^a}_{\mathcal{H}^{ab}_{local}},\quad \text{Negative: } \mathcal{F}_{ea}(I^a) \qquad \text{Equation 13}$$

When distorting from the second training image $I_b$ to the first training image $I^a$, the correlation amount (Anchor; Positive, and Negative) of the general reverse triplet loss function $Loss_{tri\_b}$ may be expressed as Equation 14 below.

$$\text{Anchor: } \mathcal{F}_{ea}(I^a),\ \text{Positive: } \mathcal{W}^b_{fus} \times \mathcal{W}arp^{I^b}_{\mathcal{H}^{ba}_{local}},\quad \text{Negative: } \mathcal{F}_{ea}(I^b) \qquad \text{Equation 14}$$

The training of the second neural network may be completed using Equation 11, based on the local homography matrices of each training image pair, the training mask pairs, and each training image pair.

The image processing method may be applied to tasks such as image alignment, image stitching, camera calibration, simultaneous localization and mapping (SLAM), etc., may generate an accurate image alignment effect in an image pair, and may generate a natural fusion effect in addition to considering parallax problems caused by different planes (or pseudo planes).

In addition, at least one of the modules described herein may be implemented through an artificial intelligence (AI) model. AI-related functions may be performed by a non-volatile memory, a volatile memory, and a processor.

Figure 14:
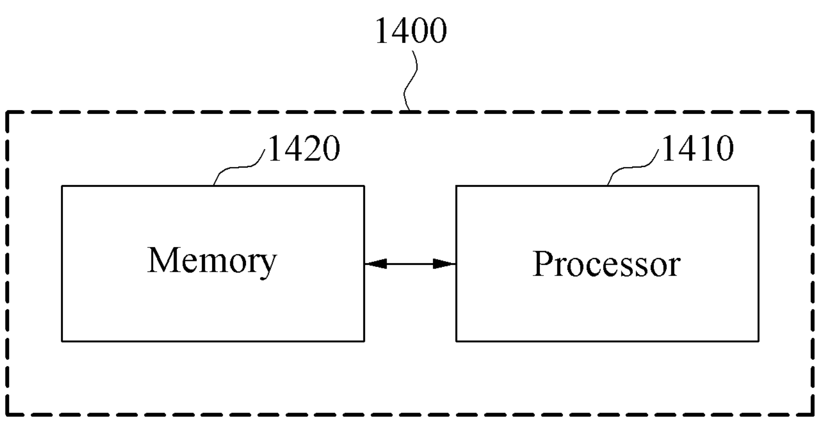
FIG. 14 illustrates an example of an electronic device, according to one or more embodiments.

FIG. 14 illustrates an example configuration of an electronic device, according to one or more embodiments.

Referring to FIG. 14, an electronic device 1400 may include a processor 1410 and a memory 1420.

The memory 1420 may store an operating system, application program, and storage data for controlling the overall operation of the electronic device 1400. Additionally, the memory 1420 may store an image to be processed, a processed resulting image, and related information generated in the process of processing an image according to the present disclosure.

The processor 1410 may generate segmentation mask pairs of a first image and a second image by respectively segmenting the first image and the second image, generate local homography matrices of the first image with respect to the second image, based on the segmentation mask pairs, the first image, and the second image, and generate a resulting image obtained by aligning the first image with the second image, based on the local homography matrices, the segmentation mask pairs, the first image, and the second image.

That is, the processor 1410 may perform the image processing method. The processor 1410 may include components of the image processing apparatus of FIG. 3. The processor 1410 may include at least one processor.

The at least one processor may be, for example, a general-purpose processor (e.g., a central processing unit (CPU) and an application processor (AP), etc.), or graphics-dedicated processor (e.g., a graphics processing unit (GPU) and a vision processing unit (VPU)), and/or AI-dedicated processor (e.g., a neural processing unit (NPU)). The at least one processor may control processing of input data according to a predefined operation rule or AI model stored in a non-volatile memory and a volatile memory. The predefined operation rule or AI model may be provided through training or learning. Here, providing the predefined operation rule or AI model through learning may indicate generating a predefined operation rule or AI model with desired characteristics by applying a learning algorithm to fragments of training data. The learning may be performed by a device having an AI function, or by a separate server, device, and/or system.

The learning algorithm may be a method of training a predetermined target device, for example, a robot, based on fragments of training data and of enabling, allowing, or controlling the predetermined target device to perform determination or prediction. The learning algorithm may include, but is not limited to, for example, supervised learning, unsupervised learning, semi-supervised learning, or reinforcement learning.

The AI model may be generated through training. Here, 'being generated through training' may refer to generating a predefined operation rule or AI model configured to perform a necessary feature (or objective) by training a basic AI model with fragments of training data through a learning algorithm.

For example, the AI model may include neural network layers. Each layer has weights, and the calculation of one layer may be performed based on the calculation result of a previous layer and the weights of the current layer. A neural network may include, for example, a CNN, deep neural network (DNN), RNN, restricted Boltzmann machine (RBM), deep belief network (DBN), bidirectional recurrent deep neural network (BRDNN), generative adversarial network (GAN), and deep Q network but is not limited thereto.

The at least processor may execute instructions or code stored in the memory 1420, and the memory 1420 may further store data. The instructions and data may also be transmitted and received over a network via a network interface device that may use any known transport protocol.

For example, the memory 1420 may be integrated with at least one processor by arranging random-access memory (RAM) or flash memory in an integrated circuit microprocessor or the like. The memory 1420 may also include a separate device such as an external disk drive, a storage array, or other storage devices that may be used by any database system. The memory 1420 and at least one processor may be operatively connected or may communicate through an input/output (I/O) port or a network connection so that the at least one processor may read files stored in the memory 1420.

In addition, the electronic device 1400 may further include a video display (e.g., a liquid crystal display (LCD)) and a user interaction interface (e.g., a keyboard, a mouse, or a touch input device). All components of the electronic device 1400 may be connected to one another through a bus and/or a network.

The computing apparatuses, the electronic devices, the processors, the memories, the images/image sensors, the displays, the information output system and hardware, the storage devices, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of processing an image, the method comprising:

segmenting both a first image and a second image to generate first segmentation masks of the first image and second segmentation masks of th e second image, and generating segmentation mask pairs by deter 1 matches between t amentation masks and the second segmentation masks, each segmentation mask pair having a first segmentation mask of the first image and a second segmentation mask of the second image;

generating local homography matrices of the first image with respect to the second image, based on the segmentation mask pairs, the first image, and the second image; and generating a synthetic image obtained by aligning the first image with the second image, wherein the aligning is performed based on the local homography matrices, the segmentation mask pairs, the first image, and the second image.

2. The method of claim 1, wherein the first and second image are images of a scene comprised of regions respectively corresponding to the segmentation mask pairs, and wherein each segmentation mask pair's images both correspond to the segmentation mask pair's region.

3. The method of claim 1, wherein the segmenting the first image and the second image comprises generating first initial segmentation masks of the first image and second initial segmentation masks of the second image; and wherein generating the segmentation mask pairs comprises post-processing the first initial segmentation masks and the second initial segmentation masks.

4. The method of claim 3, wherein the post-processing comprises:

determining first segmentation masks according to the first initial segmentation masks and determining a second segmentation masks according to the second initial segmentation masks;

selecting N of the first segmentation masks from the first segmentation masks and selecting N of the second segmentation masks from the second segmentation masks;

merging an unselected first segmentation mask into one of the N first segmentation masks and merging an unselected second segmentation mask into one of the N second segmentation masks; and generating the segmentation mask pairs by performing mask the matching between the N first segmentation masks and the N second segmentation masks, wherein each of the first segmentation masks and the second segmentation masks is a segmentation mask of a connected region, and wherein an area of each of the N first segmentation masks and the N second segmentation masks is greater than a first threshold value.

5. The method of claim 4, wherein the determining of the first segmentation masks according to the first initial segmentation masks and determining the second segmentation masks according to the second initial segmentation masks comprises:

in response to a case in which a first segmentation fragment, which is an initial segmentation mask having an area less than a second threshold value, exists among the first initial segmentation masks, filling, among the first initial segmentation masks, the first segmentation fragment using a mask adjacent to the first segmentation fragment and determining each connected region of the first initial segmentation masks to be a first segmentation mask after performing the filling;

determining the each connected region of the first initial segmentation masks to be a first segmentation mask in response to a case in which the first segmentation fragment does not exist;

in response to a case in which a second segmentation fragment, which is an initial segmentation mask having an area less than the second threshold value, exists among the second initial segmentation masks, filling, among the second initial segmentation masks, the second segmentation fragment using a mask adjacent to the second segmentation fragment and determining each connected region of the second initial segmentation masks to be a second segmentation mask after performing the filling; and determining the each connected region of the second initial segmentation masks to be a second segmentation mask in response to a case in which the second segmentation fragment does not exist, wherein the first threshold value is greater than the second threshold value.

6. The method of claim 4, wherein the merging of the unselected first segmentation mask into the one of the N first segmentation masks and merging the unselected second segmentation mask into the one of the N second segmentation masks comprise at least one of:

in response to a case in which at least one adjacent segmentation mask that is adjacent to the unselected first segmentation mask exists among the N first segmentation masks, merging, in the at least one adjacent segmentation mask, the unselected first segmentation mask into one adjacent segmentation mask that is closest to the unselected first segmentation mask;

in response to a case in which an adjacent segmentation mask that is adjacent to the unselected first segmentation mask does not exist among the N first segmentation masks, merging, among the N first segmentation masks, the unselected first segmentation mask into one first segmentation mask that is closest to the unselected first segmentation mask;

in response to a case in which at least one adjacent segmentation mask that is adjacent to the unselected second segmentation mask exists among the N second segmentation masks, merging, in the at least one adjacent segmentation mask, the unselected second segmentation mask into one adjacent segmentation mask that is closest to the unselected second segmentation mask; or in response to a case in which an adjacent segmentation mask that is adjacent to the unselected second segmentation mask does not exist among the N second segmentation masks, merging, among the N second segmentation masks, the unselected second segmentation mask into one first segmentation mask that is closest to the unselected second segmentation mask.

7. The method of claim 4, wherein a first segmentation mask and a second segmentation mask comprised in each of the segmentation mask pairs satisfy the following conditions: the first segmentation mask and the second segmentation mask belong to a same category, have a least distance therebetween, and have an overlap that satisfies a fourth threshold.

8. The method of claim 1, wherein the generating of the local homography matrices of the first image with respect to the second image comprises generating the local homography matrices by applying a first neural network to the segmentation mask pairs, the first image, and the second image.

9. The method of claim 8, wherein the generating of the local homography matrices by applying the first neural network to the segmentation mask pairs, the first image, and the second image, comprises:

generating an encoding pyramid feature for the first image, based on a feature map of the first image and first segmentation masks in the segmentation mask pairs;

generating an encoding pyramid feature for the second image, based on a feature map of the second image and second segmentation masks in the segmentation mask pairs; and predicting the local homography matrices based on the encoding pyramid feature for the first image and the encoding pyramid feature for the second image.

10. The method of claim 8, further comprising:

segmenting both a first training image and a second training image of a training image pair and generating a training segmentation mask pairs of the training image pair; and generating the first neural network by training with the training image pair and the training segmentation mask pairs, based on the training segmentation mask pairs of the training image pair, wherein the training segmentation mask pair comprises a segmentation mask for one region of the first training image and a segmentation mask for a region corresponding to the one region of the first training image in the second training image.

11. The method of claim 10, wherein the segmenting of the first training image and the second training image respectively and the generating the training segmentation mask pairs of the training image pair comprises:

segmenting the first training image and the second training image respectively from one training image pair and generating initial segmentation masks of the first training image and initial segmentation masks of the second training image; and generating training segmentation mask pairs of the training image pair by post- processing the initial segmentation masks of the first training image and the initial segmentation masks of the second training image.

12. The method of claim 11, wherein the generating of the training segmentation mask pairs of the one training image pair by post-processing the initial segmentation masks of the first training image and the initial segmentation masks of the second training image comprises:

determining a first training segmentation masks of the first training image according to the initial segmentation masks of the first training image and determining a second training segmentation masks of the second training image according to the initial segmentation masks of the second training image;

selecting all first training segmentation masks having areas greater than a first threshold value from the first training segmentation masks and selecting all second training segmentation masks having areas greater than the first threshold value from the second training segmentation masks;

removing all segmentation masks of a preset category from among the selected first training segmentation masks and the selected second training segmentation masks; and generating the training segmentation mask pairs of the one training image pair by performing mask matching on a remaining first training segmentation mask among all the selected first training segmentation masks after the removing and on a remaining second training segmentation mask among all the selected second training segmentation masks after the removing.

13. The method of claim 1, wherein a segmentation mask pair are formed by determining that a segmentation mask of the first image matches a segmentation mask of the second image.

14. The method of claim 1, wherein the generating of the resulting image obtained by aligning the first image with the second image, based on the local homography matrices, the segmentation mask pairs, the first image, and the second image, comprises:

generating distorted images by applying the respective local homography matrices to the first or second image; and applying weights to the distorted images and fusing the weighted distorted images.

15. The method of claim 14, wherein the weights comprise a trained weight matrix.

16. The method of claim 14, wherein the trained weight matrix is trained according to training segmentation mask pairs of a pair of training images.

17. The method of claim 16, wherein the training segmentation mask pairs are formed by merging segment mask fragments having an area that satisfies a threshold.

18. The method of claim 1, wherein each homography matrix aligns a region of the first image with a corresponding region of the second image.

19. The method of claim 18, wherein one of the segmentation masks in one of the segmentation mask pairs is formed by merging two initial segmentation masks determined to have a same classification, the classifications of the initial segmentation masks determined from the first or second image.

20. An electronic device comprising:

one or more processors; and memory storing computer-executable instructions configured to cause the one or more processors to:

segment both a first image and a second image generate first segmentation masks of the first image and second s egmentation eco je, and generate a segmentation mask pairs by determin ree n masks and the second segmentation masks, each segmentation mask pair having a first segmentation mask of the first image and a second segmentation mask of the second image;

generate a local homography matrices of the first image with respect to the second image, based on the segmentation mask pairs, the first image, and the second image; and generate a synthetic image obtained by aligning the first image with the second image, wherein the aligning is performed based on the local homography matrices, the segmentation mask pairs, the first image, and the second image.

* * * * *